(12) United States Patent
Patidar et al.

(10) Patent No.: US 9,304,981 B1
(45) Date of Patent: Apr. 5, 2016

(54) SYSTEM AND METHOD FOR PROVIDING AN INTER-APPLICATION OVERLAY TO COMMUNICATE INFORMATION BETWEEN USERS AND TOOLS IN THE EDA DESIGN FLOW

(75) Inventors: Sachin Patidar, Greater Noida Up (IN); Avinandan Sengupta, Noida Up (IN); Chakresh Maheshwari, Ghaziabad Up (IN)

(73) Assignee: Cadence Design Systems, Inc., San Jose, CA (US)

( * ) Notice: Subject to any disclaimer, the term of this patent is extended or adjusted under 35 U.S.C. 154(b) by 441 days.

(21) Appl. No.: 13/229,064

(22) Filed: Sep. 9, 2011

(51) Int. Cl.
  *G06F 17/24* (2006.01)
  *G06F 17/30* (2006.01)

(52) U.S. Cl.
  CPC ........ *G06F 17/241* (2013.01); *G06F 17/30525* (2013.01)

(58) Field of Classification Search
  USPC .......................... 715/230, 231, 232, 233, 211
  See application file for complete search history.

(56) References Cited

U.S. PATENT DOCUMENTS

| | | | |
|---|---|---|---|
| 6,904,571 B1 * | 6/2005 | Schmidt et al. | 716/112 |
| 2003/0084409 A1 * | 5/2003 | Abt et al. | 716/1 |
| 2006/0095882 A1 * | 5/2006 | Mankin et al. | 716/11 |
| 2009/0064077 A1 * | 3/2009 | Uppaluri et al. | 716/11 |
| 2011/0016444 A1 * | 1/2011 | Paris et al. | 716/111 |

OTHER PUBLICATIONS

Cadence Design Systems, Inc., OrCAD Flow tutorial, Sep. 2009, Cadence Design Systems, Inc., Product Version 16.3.*
Oracle AutoVue 20.0.1 User Manual, Mar. 1, 2011, Oracle, p. 193-267.*
Altium, understanding design annotation, Mar. 19, 2008, Altium Limited, p. 1-3, 5-7, 9-10, 14, 19 and 23-27.*
Nate, "Beginning Embedded Electronics—10", Jun. 19, 2008, SparkFun Electronics, https://www.sparkfun.com/tutorials/110, p. 3 and 5-7.*
LektroiD, a bulletin board posting titled "Korg Mini Pops 7 percussion module" found in http://electro-music.com/forum/topic-35600.html, Sep. 22, 2009, electro-music.com, p. 1, 4 and 8.*

* cited by examiner

*Primary Examiner* — Scott Baderman
*Assistant Examiner* — Seung Jung
(74) *Attorney, Agent, or Firm* — Rosenberg, Klein & Lee

(57) ABSTRACT

A method and system are provided for utilizing inter-application image overlays or virtual transparent overlays (VTOs) to communicate information between users and tools along the EDA tool chain in an EDA design flow. VTOs remain divorced from an underlying design file and are able to be manipulated by a plurality of different users in a plurality of different EDA applications or tools, all meant to operate in different stages of the design flow and perform different functions along the design path towards actual physical circuit realization and fabrication.

21 Claims, 29 Drawing Sheets

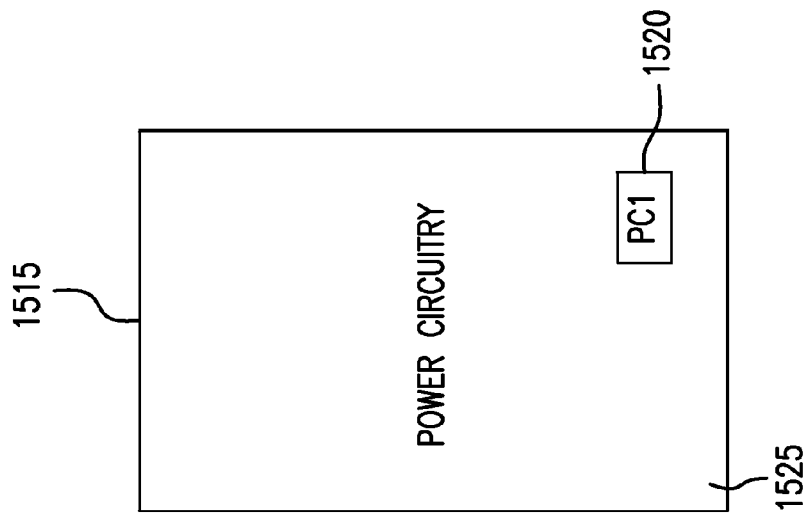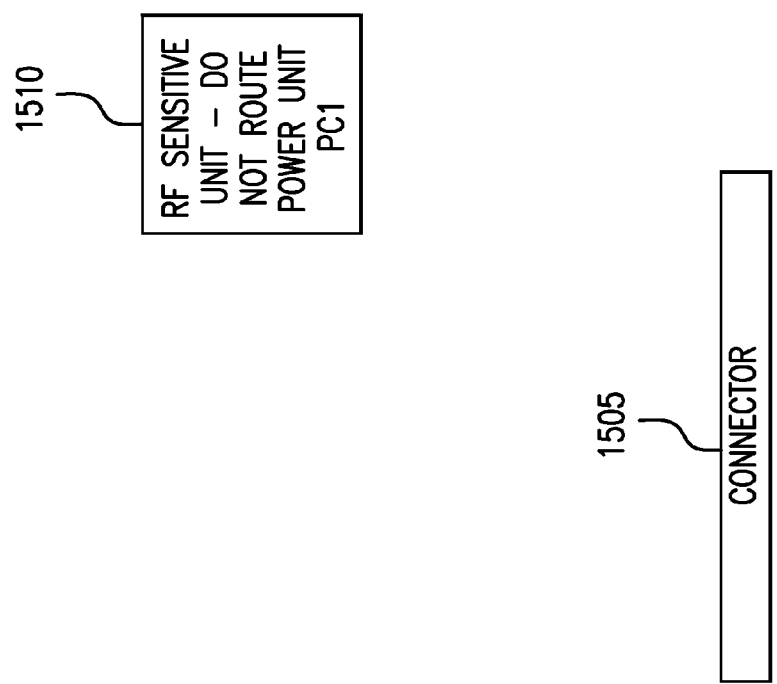
FIG.15

SYSTEM AND METHOD FOR PROVIDING AN INTER-APPLICATION OVERLAY TO COMMUNICATE INFORMATION BETWEEN USERS AND TOOLS IN THE EDA DESIGN FLOW

BACKGROUND OF THE INVENTION

1. Field of the Invention

The present invention is generally directed to a method and system for providing an inter-application overlay to communicate information between users and tools in the electronic design automation (EDA) design flow. More specifically, the present invention is directed to a method and system for sharing annotations to a design between a first application and a second distinct application performing a different function on an alternative representation of the design. The annotations are shared in such manner that a user can view, enter information, or modify in either or both applications without modifying the underlying design file. The annotations will preferably maintain design context and be transformed as necessary to display appropriately in alternate representations of the display between the first and second applications.

2. Description of the Related Art

In an Electronic Design Automation (EDA) design flow, it is of paramount importance to effectively capture information about an integrated circuit or other such design without losing the context of the information and without interfering with the underlying design. In the same manner, it is important to be able to communicate that information effectively between different users and between widely different tools amongst the EDA tool chain along a transformative design flow, while ensuring that the context of the information is correctly conveyed with the information. The stages of the EDA design flow will generally take a design from one starting point, generally a logical schematic view of an integrated circuit or design, and progress through several different stages of increasing specificity and detail. Several successive transformative stages of the device design along the EDA design flow may include a logical schematic stage and a physical layout stage that incorporates physical dimensionality of actual devices or component shapes into the layout. A further stage in the design flow may be a simulation stage which has a related device under test (DUT) representation for performing simulations thereupon. Yet another stage may be an actual silicon mask creation stage where the fabricated silicon wafers are created.

Each of the different stages of the EDA design flow may have a different tool or application embodied in executable code to perform a different set of functions along the design flow. A first illustrative application may be a schematic capture program, operating in the logical domain where the physical and actual components are abstracted as ideal components to be merely represented by simple, universal icons. This allows a system designer to work at a higher level without worrying about all of the details of the physical layout or device under test, but instead focus on the logical correctness of the design. Another application may be a physical layout editor application which performs a function different from a logical domain application, which focuses more on a lower level, detailed, actual implementation of the components in an integrated circuit or a printed circuit board (PCB), and the routing of interconnections for/between those components. Another exemplary application may be a Printed Circuit Board (PCB) layout tool which focuses on the arrangement entirety of the PCB. Yet another application may be a tool for creating an actual silicon mask to fabricate semiconductor devices.

Generally, a circuit or design is represented in a computer storage device either as a database or any other computer readable file known to one in the art. Such a file may indeed include a plurality of different representations of the same device design, such as a logical schematic, a physical layout, PCB layout, a device under test (DUT), an actual silicon mask, or any other relevant representation of the components and the design.

Any of the designers at various points along the EDA design flow may wish to annotate a specific representation of the device, design, or integrated circuit (used interchangeably herein). In the past, to do this, designers would have to modify the underlying design file, which gave rise to numerous issues and problems down the road.

Alternatively, designers may create a Word, Excel, Powerpoint, text, or any other such document to annotate or keep track of various attributes, design intents, routing, net lists, or other such information. In doing so, the context, correlation/relation to the actual components or objects in the design could be lost. Furthermore, even if the cross-relation between the external notes and the elements or objects of the design could be re-created, such re-creation typically proves time consuming and error prone. Still further, allowing any designer, of which there may be thousands working contemporaneously, or in collaboration, to edit an underlying design file, potential problems are manifest. Any single designer could potentially make devastating changes (intentionally or inadvertently) which may affect the entirety of the design.

If a problem was introduced into the design file, a painstaking debugging process of inspecting, tracing, and attempting to discern where the problem lies will need to be performed. Such a debugging effort is iterative and affects the entirety of the design in numerous different facets. Therefore, any time a designer along a design flow, conventionally, makes annotations or modifies a design file to accommodate notes or other such information, the possibility of triggering a very expensive and time consuming debugging process is occasioned.

Conversely, there is the possibility of over-saturation of information and annotations entering a design file. If each designer along the EDA design flow inputs even just a modicum of information, the design may be quickly overwhelmed with tremendous amounts of information though the information may be irrelevant to the vast majority of other designers along the design flow. Such over-saturation or bombardment of information is likely to hinder efforts of designers to focus solely and myopically on their intended function and thus result in delays and over-runs.

There is therefore a need for a method and system for providing a virtual transparent overlay (VTO) or other such inter-application overlay (used interchangeably herein) operable to convey information between users and between tools along an EDA design flow without modifying the underlying design file.

There is therefore a need for a method and system for automatically managing multiple different inter-application overlays to selectively group and modify, create, edit, remove, and selectively display one or more portions or the entirety of each overlay as needed.

SUMMARY OF THE INVENTION

An object of the present invention is to provide a system and method for providing inter-application overlays to communicate information between users.

Another object of the present invention is to provide a system and method for managing a plurality of inter-application overlays amongst applications operable to perform different tasks along the EDA design flow.

Another object of the present invention is to provide a system and method for correlating annotations specific to a design with respective objects in the design across multiple tools, domains, and transformative alternate representations in the EDA tool chain.

Another object of the present invention is to provide convenient and secure measures to accept annotations from a plurality of users without affecting the underlying design but while maintaining context.

Another object of the present invention is to provide a system and method for selectively combining a plurality of inter-application overlays to provide all relevant information to designers along the EDA design flow.

It is yet another object of the present invention to provide a system and method for accepting input or annotations of any form from a user in a first representation of a design and transform those annotations into a format of an alternative representation of that design in a different secondary application.

These and other objects are attained by the method and system implemented in accordance with the present invention.

A method for applying an image overlay to visually annotate an image display of a plurality of objects generated by a native application includes executing a modular application for generating an image overlay and a native application in a processor. The native application generates a native image to include a graphic representation of a plurality of objects, while the modular application generates the image overlay to include at least one visual annotation for the objects. The Native application is executed in an independent manner from the modular application to generate its own native image. The modular application, however, is executed to operate parasitically in relation to the native application to extract therefrom an identification and arrangement of the objects contained in the native image. One or more of the visual annotations corresponding to the identified objects of the native image are incorporated into the image overlay. The image overlay is concurrently displayed in transposed relation over the native image to visually merge therewith to form a composite display.

Another exemplary embodiment provides a method for providing an inter-application image overlay to transfer visual annotations between a plurality of distinct application for display with images respectively generated by the applications. Such method establishes first and second applications on a storage medium, wherein the first application includes executable code which is operable to perform at least one stage of an automated design workflow for a design that has a plurality of objects. The second application includes a different executable code which operates to perform a different stage of the automated design workflow. The first application is executed in a processor to thereby generate a first image including a graphic representation of a set of the objects. An inter-application image overlay which includes at least one visual annotation for at least one of the objects is established to be modifiable in both the first and second applications. The inter-application image overlay and the first image are concurrently displayed with the inter-application image overlay being transposed over the first image of the objects to form a first composite display therewith. The second application is executed in the processor to thereby generate a second image including an alternate graphic representation of at least a portion of the objects. The inter-application image overlay is adapted responsive to the alternate graphic representation of the objects and the adapted inter-application image overlay is concurrently displayed in transposed relation with the second image of the objects to thereby form a second composite display.

Another exemplary embodiment provides a system for providing an inter-application image overlay to transfer visual annotations between a plurality of distinct applications for display with images respectively generated by the applications. Such system includes a storage module which stores at least one design which includes interconnected objects. A processing unit is operably coupled to the storage module, the processing unit includes a first application module, a second application module, and an overlay module. The first application module is operable to generate a first image including a graphic representation of a plurality of the objects of the design retrieved from the storage module. The second application module is operable to generate a second image which includes an alternate representation of at least a portion of the objects of the design retrieved from the storage module. The overlay module is provided which is operable to generate an inter-application image overlay which includes the visual annotations. The overlay module is further operable to generate both a first composite display including the inter-application image overlay transposed on the first image of the first application module and generate a second composite display including the inter-application image overlay transposed on the second image of the second application module after adaptively configuring the inter-application image overlay between the first and second application modules. A display unit is operably coupled to the processing unit. The display unit is operable to receive and display output from the processing unit.

Another exemplary embodiment provides a method for adapting a legacy design into a style-template-conforming design. The method includes establishing a design to include a plurality of interconnected objects. The design is defined by a design file. A Virtual Transparent Overlay (VTO) is automatically created to include a plurality of predetermined grouping sections established along predetermined peripheral portions of the VTO to each contain a homogenous collection of objects of the design. Each object is respectively related to the predetermined grouping section. The design file is surveyed to determine a type of each object contained in the design. A duplicate graphic representation of each object is created responsive to a determination that the object type is related to one of the predetermined groups. The created duplicate graphic representation of the object is placed in the corresponding group section of the VTO. The VTO is concurrently displayed in transposed relation over a graphic representation of the design to form a composite display therewith.

BRIEF DESCRIPTION OF THE DRAWINGS

FIG. 15 is a VTO created in accordance with certain embodiments of the present invention;

DETAILED DESCRIPTION OF THE PREFERRED EMBODIMENTS

Figure 1:
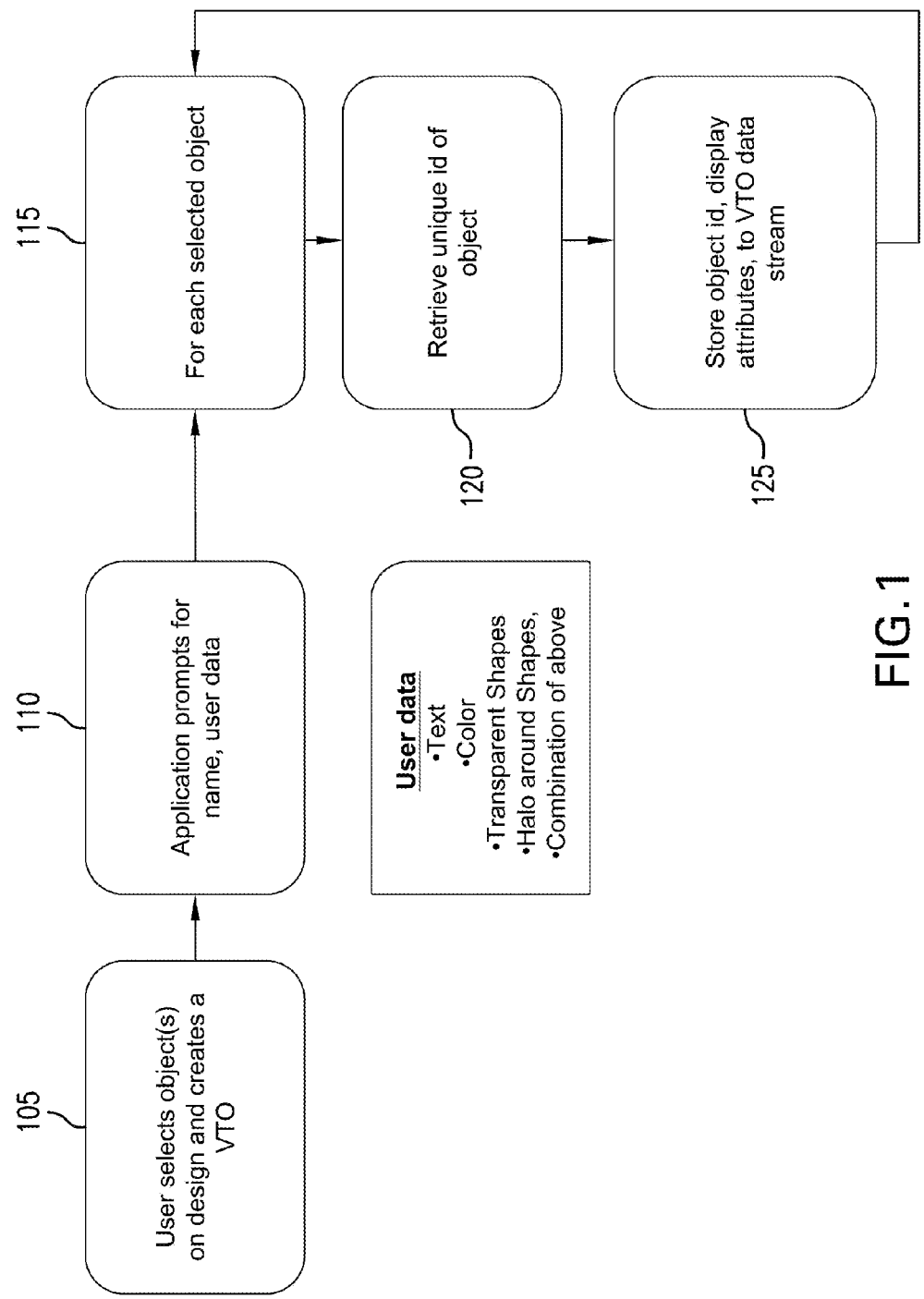
FIG. 1 is a flow diagram of a method for providing an inter-application overlay in accordance with an exemplary embodiment of the present invention.

In the design and implementation of integrated circuits along a design flow progressing through a variety of different stages, domains, tools, and intended operations, it is important to accurately and conveniently communicate information from designer to designer amongst different tools in the Electronic Design Automation (EDA) tool chain. Typically, circuit designers, engineers, package engineers, PCB layout engineers, and other such users involved in the EDA process will shoehorn a means of communicating information into an actual design file. To accomplish this, designers may modify a design itself to include annotations and information relevant thereto. Alternatively, they may make annotations via a Word document, Excel spreadsheet, Powerpoint presentation, Notepad text, email, or any other measures to record annotations or information and pass those on to other users.

Unfortunately, such conventional methods introduce potential unwanted problems into the process. With communications and annotations outside of the design file in, for example, a word document, the context or correlation between the annotations and the actual components of the design they relate to are lost or broken. This requires designers to then search through a very complicated design which could include thousands of relevant components to find the specifically referenced components for proper correlation with the annotations. This is a laborious, error prone, time consuming, and expensive process that is far from ideal. Alternatively, annotations recorded directly into the design lead to information saturation, over-cluttering, occlude important features, and potentially introduce errors into the design itself.

While the idea of selectively visible layers have been used in other contexts, such uses, as in Adobe Photoshop, are typically limited to but one application. It is seen in such an application as Photoshop that when layers are modified, selected, and reviewed, the actions all occur within a single application and single domain—that of a photo editing session in the given application. Various transparent layers are not individually addressable in other programs and most certainly not programs which perform different tasks along an Electronic Design Automation (EDA) design flow with transformed representations of the design at respective stages. Indeed, it is seen that for such layers to function at all for their intended purpose, the layers must maintain a rigid spatial relation one to another and are not transformed.

In accordance with one illustrative embodiment of a system and method formed in accordance with the present invention, an inter-application overlay is provided to communicate information in versatile manner between users. The overlay is correlated with a user's displayed application view of designated interconnected objects. In broad concept, a first user may select an object in a first application displaying a design view and then inputs annotations or information related to that object into a virtual transparent overlay (VTO) or inter-application overlay (both used interchangeably herein). A second user may open a second application to perform a different function along the electronic design automation (EDA) design flow. The second user may be given the option in the second application to display a VTO or inter-application overlay that was annotated or created in the first application. This VTO is transformed from the original input information to correlate with the second application's alternate representation of the device in the design file.

FIG. 1 illustrates a flow diagram of certain processes carried out in an exemplary embodiment of the present invention. At block 105, a user selects objects such as integrated circuits, components, objects, or cells (used interchangeably herein) of the design in the first application, and thereby creates, instantiates, or defines a virtual transparent overlay (VTO). At block 110, the application may prompt for a name for the VTO and user data. Any type of user data may be entered, such as text annotations, information, design intents, colors, highlighting, transparent shapes, halos, dynamic simulation data, metadata, combinations thereof. Even digital objects may be stored into a VTO. At block 115, a process loop is started where, for each selected object, the application will retrieve a unique ID (UID) of each object, potentially a Reference Designation (RefDes) of each object. The RefDes may suffice if it is sufficiently unique across the design. However, a more preferable UID would be a combination of the canonical path and RefDes to uniquely identify the object. The design file may be searched to find metadata related to or identifying each object that was selected by a first user. Block 120 performs this retrieval of a UID of the object. Block 125 stores the UID, display attributes, and potentially other relevant information into a VTO data stream or the inter-application overlay file. Preferably, this VTO or inter-application overlay file is created and stored separately from an underlying design file of the integrated circuit such that the design file is not modified even though, to a user, the annotations appear to be in the design file. This loop from block 125 back to block 115 is repeated for each selected object.

The UID may be used as a VTO data table reference to provide access to the data input related to the selected object. A lookup table, database, or any other data structure may be used for this purpose. In a preferred embodiment, the VTO's data stream or data files are maintained in a separate file from the design file to allow inter-application usability and also to prevent problems discussed above with allowing designers free access to the design file.

Figure 2:
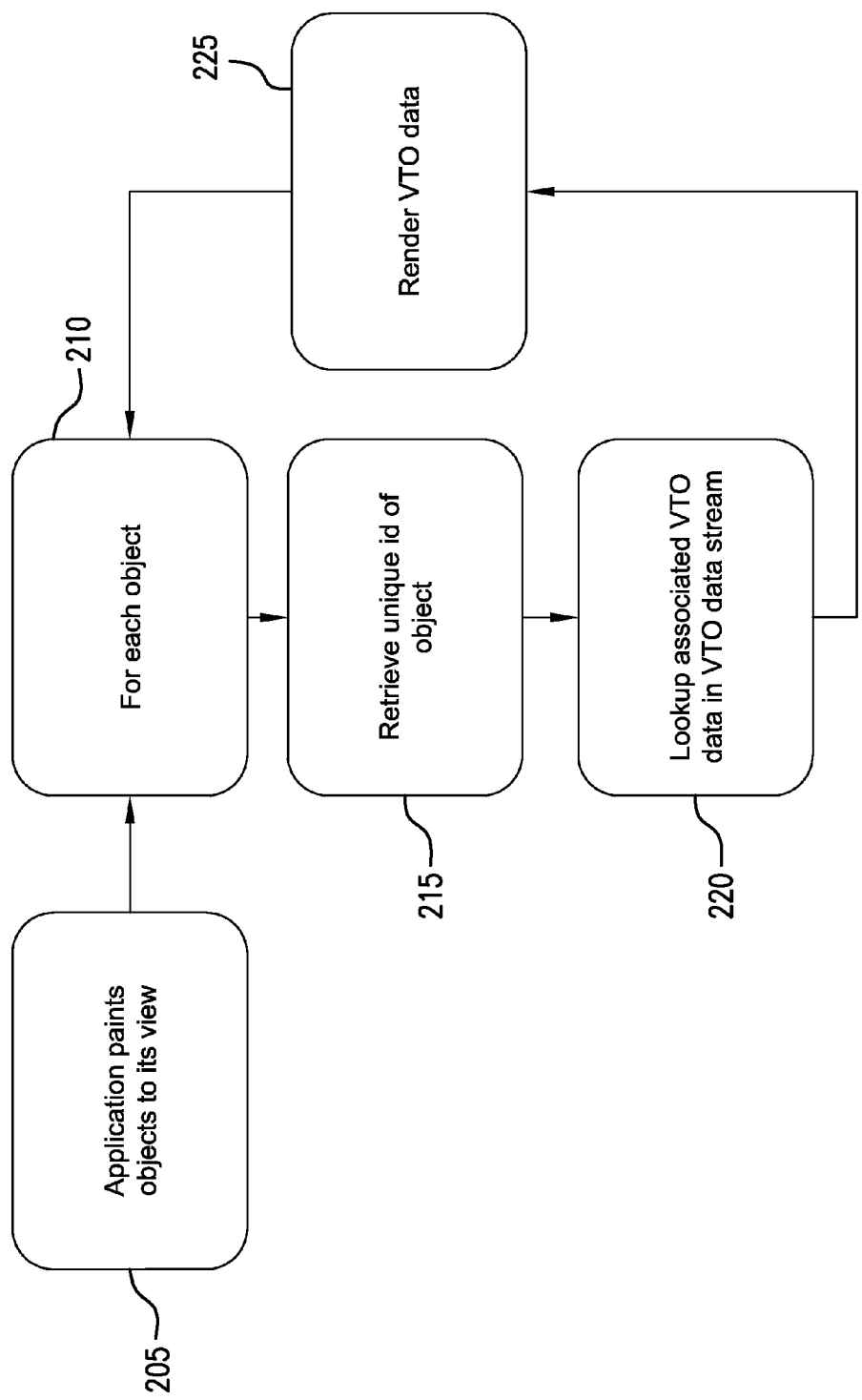
FIG. 2 is a flow diagram of a method for displaying and aligning a virtual transparent overlay (VTO) or inter-application-overlay (used interchangeably herein) in accordance with an exemplary embodiment of the present invention.

FIG. 2 is another simplified flow diagram of a method for using the VTO or inter-application overlays. At block 205, an application renders objects to its view. Generally, the application renders at least a portion of a design file showing a plurality of interconnected objects in the design file of the integrated circuit or other device being designed. At block 210, it is determined which objects are in the particular display of the application, preferably by querying the given application. For each object that is in the currently displayed window of the application, the application is queried to retrieve the unique ID or object ID (used interchangeably) of the objects on display at block 215. The object ID is used at block 220 to look up the associated VTO data in the VTO data stream to make available annotations or information entered in regard to the specific object. At block 225, the VTO data is rendered onto an overlay above the display of the application in superimposed relation.

Figure 3:
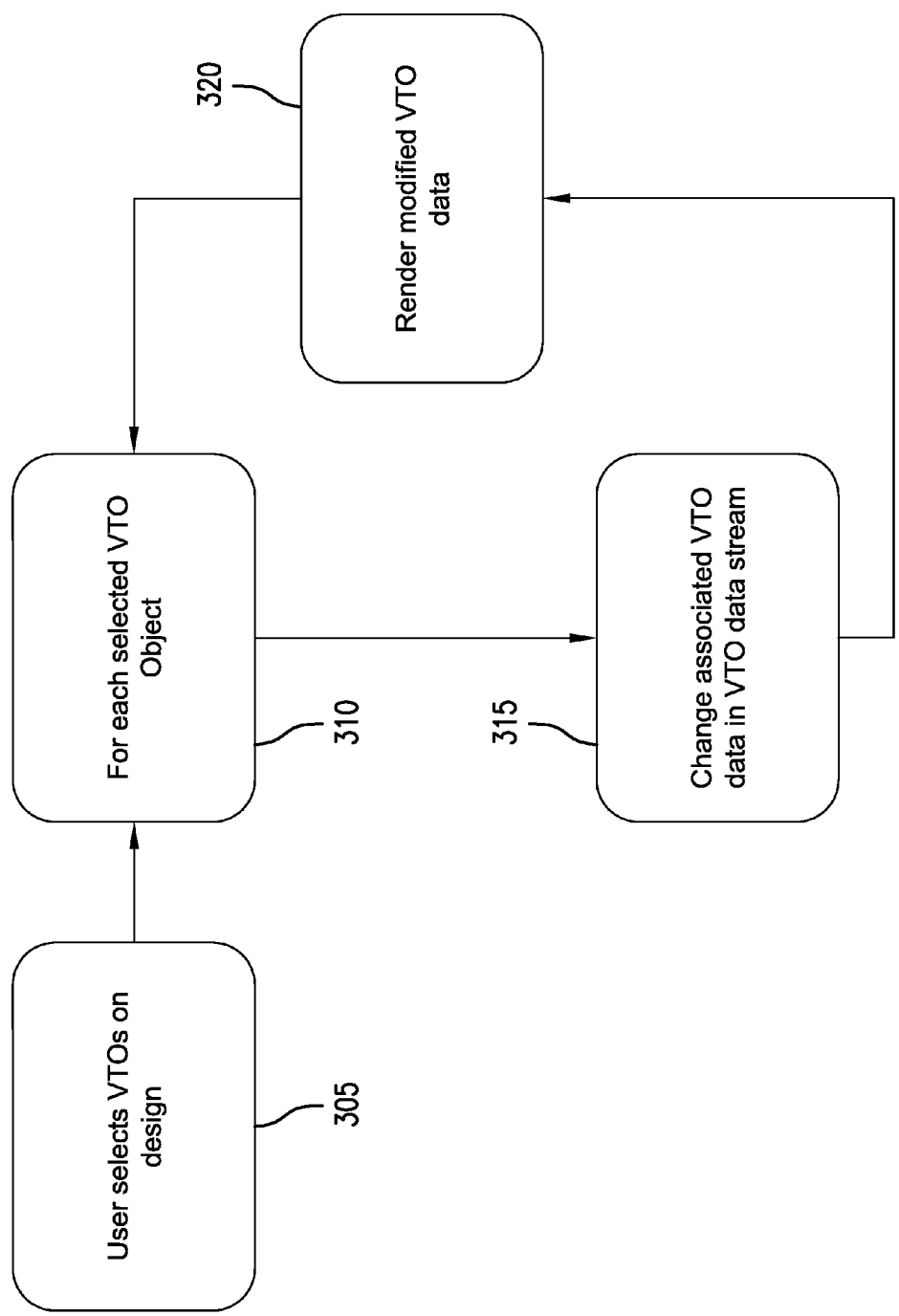
FIG. 3 is a flow diagram of a method for modifying established VTOs.

FIG. 3 is another simplified flow diagram of a method of modifying VTO data or annotations related to a particular object. At block 305, the user selects VTOs on a design which could be as simple as choosing the view command in the spanner bar and dropping down to VTOs, layers, or overlays and choosing which particular VTOs or inter-application overlays the user wants to display in superimposed relation above a native display of the design file. At block 310, for each selected VTO object, a loop is entered whereby block 315 allows a user to modify associated VTO data such as annotations or information in the VTO data stream related to that selected object. At block 320, the modified VTO data is then rendered again in superimposed relation above the native display of the native application and the loop is continued back to block 310.

Figure 4:
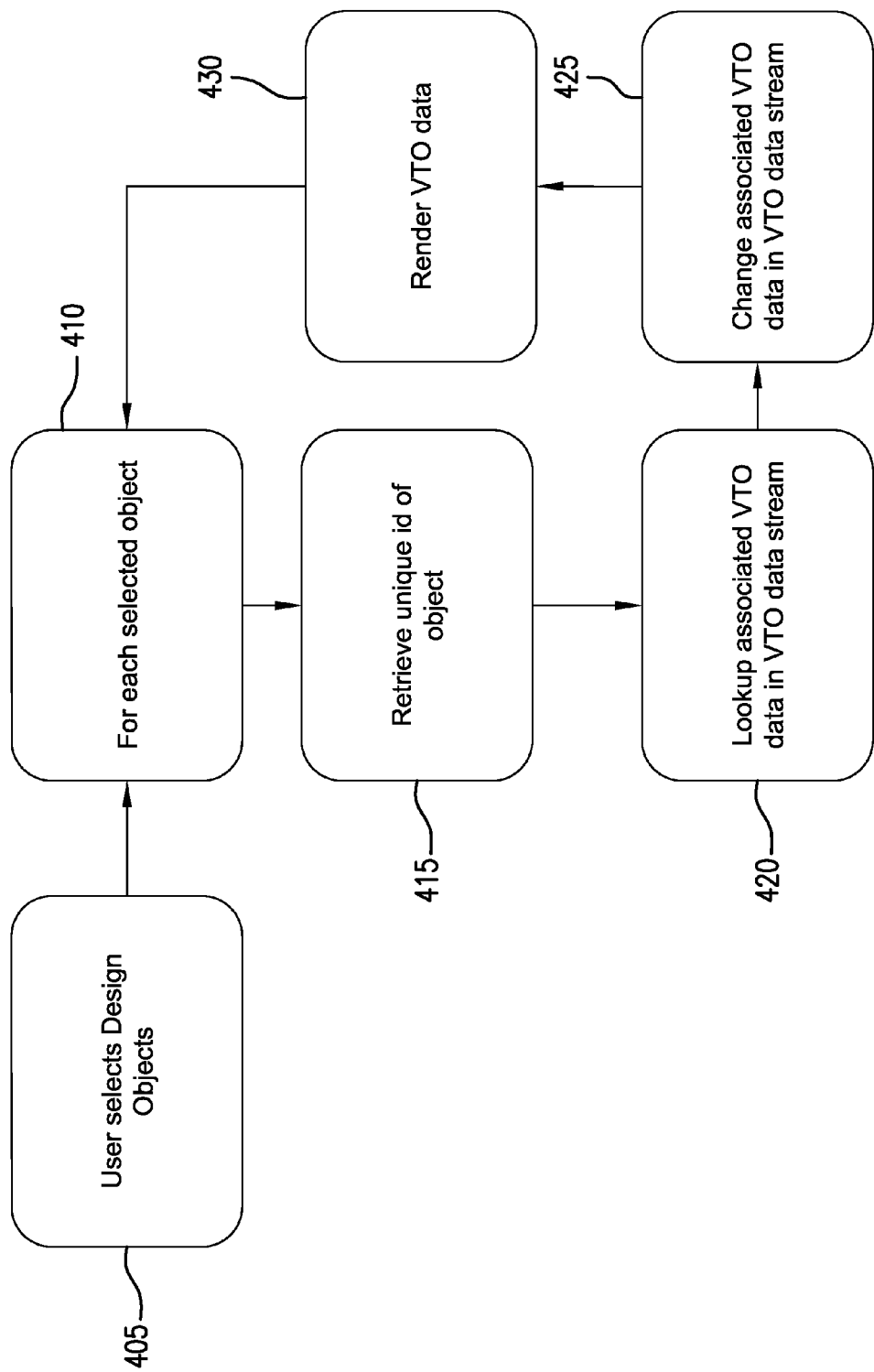
FIG. 4 is a flow diagram of a method for providing an inter-application overlay to communicate information between users and applications and correlating objects of the design file with annotations in the VTO in accordance with an exemplary embodiment of the present invention.

FIG. 4 is another simplified flow diagram for providing and modifying an inter-application overlay to communicate information between users. At block 405, a user selects design objects in a native application such as a layout or schematic editor. At block 410, a loop is started to iterate a number of times specified by the number of objects selected. At block 415, for the specific selected object, the unique ID or object ID is retrieved by querying the native application whether it be a layout, schematic editor, simulator, PCB layout, or the like. The loop then progresses to block 420 whereby the unique ID of the selected object is used to reference, preferably in a lookup table, the associated VTO data or annotations contained in the VTO data stream. At block 425, a user is provided the ability to modify information in the VTO data stream which is then saved. At block 430, the modified and saved VTO data stream is then displayed or rendered again preferably in superimposed relation above the native display of the native application design file. The flow progresses back to block 410 for another loop or iteration for another selected object. This loop continues until each selected object has been referenced, modified, rendered, and addressed.

Figure 5:
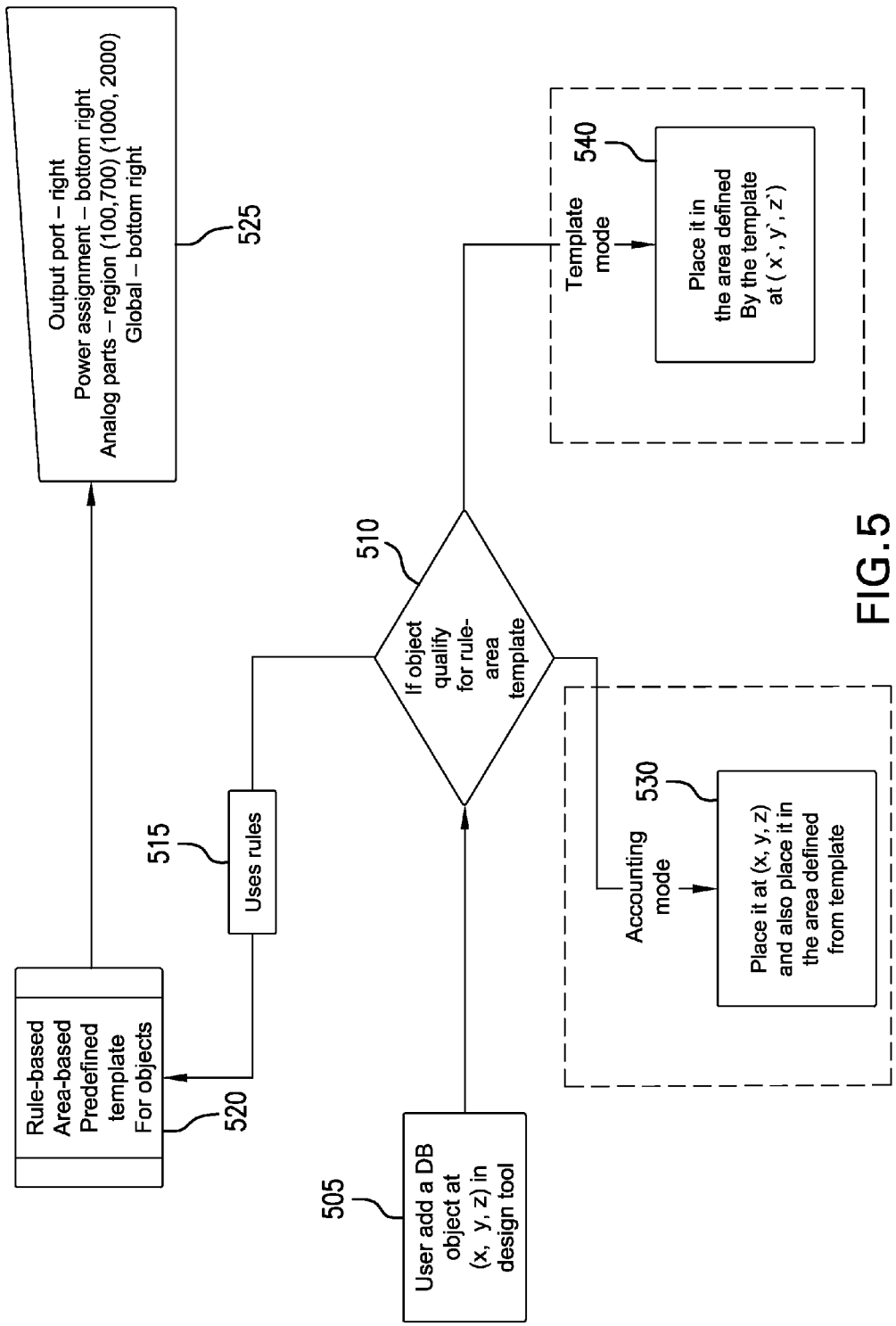
FIG. 5 is a flow diagram of a method for providing inter-application overlays or VTOs and enforcing template rules in accordance with another embodiment of the present invention.

FIG. 5 is a simplified flow diagram illustrating a method of enforcing uniform design placement requirements. This outlines another type of template where duplicates of specific types of objects are placed in specific locations to accord with a uniform placement strategy. In a first example, a legacy design is provided which does not conform to the uniform style template or placement strategy—in this instance, the legacy design is scanned for specific types of objects, such as power, analog, globals, and outputs. On recognition of an object which matches a specific type of interest, a VTO is created and populated with a duplicate representation of the identified object in a predefined location in accord with the uniform style template. In a second example, a design which does conform to a uniform style template is provided to a user. The user seeks to modify the design by adding an object. If the object to be added is determined to belong to one of the specific types of objects of interest, then the object is duplicated upon addition and the duplicate is placed in a predefined location in accordance with the uniform style guide.

At block 505, a user or designer may add an object at a specified location. Since designs may indeed have multiple different layers, each of the layers may be addressed with a Cartesian coordinate system X and Y and the different layers are addressed with a third dimension Z. At block 510, a determination is made whether the object that was just added by the user at block 505 qualifies for a rule-area template. If the object does indeed qualify for a rule or area based placement, the rules will be used at block 515 and applied to the placement. At block 520, a plurality of different types of approaches are provided, such as rule-based, area-based, and pre-defined template for the objects. At block 525, the object is placed in accordance with the rules. If, for example, an object is an output port, it will generally be provided in the right hand side of the design. If the object provided is a power assignment, this is generally placed at the bottom right hand side. If the object provided is an analog part, generally it is placed in a region defined from 100-700 or 1000-2000. If the object is a global object, it is generally placed at the bottom right.

If the determination block 510 is such that an accounting mode is used, then the object just added at block 505 will be placed in block 530 at a location of X, Y, and Z and also it is placed in an area defined from a template. If, however, the determination of block 510 is such that a template mode is to be used, then a block 540 is performed whereby the object is then automatically placed in the area defined by the template at X', Y', and Z'.

Figure 6:
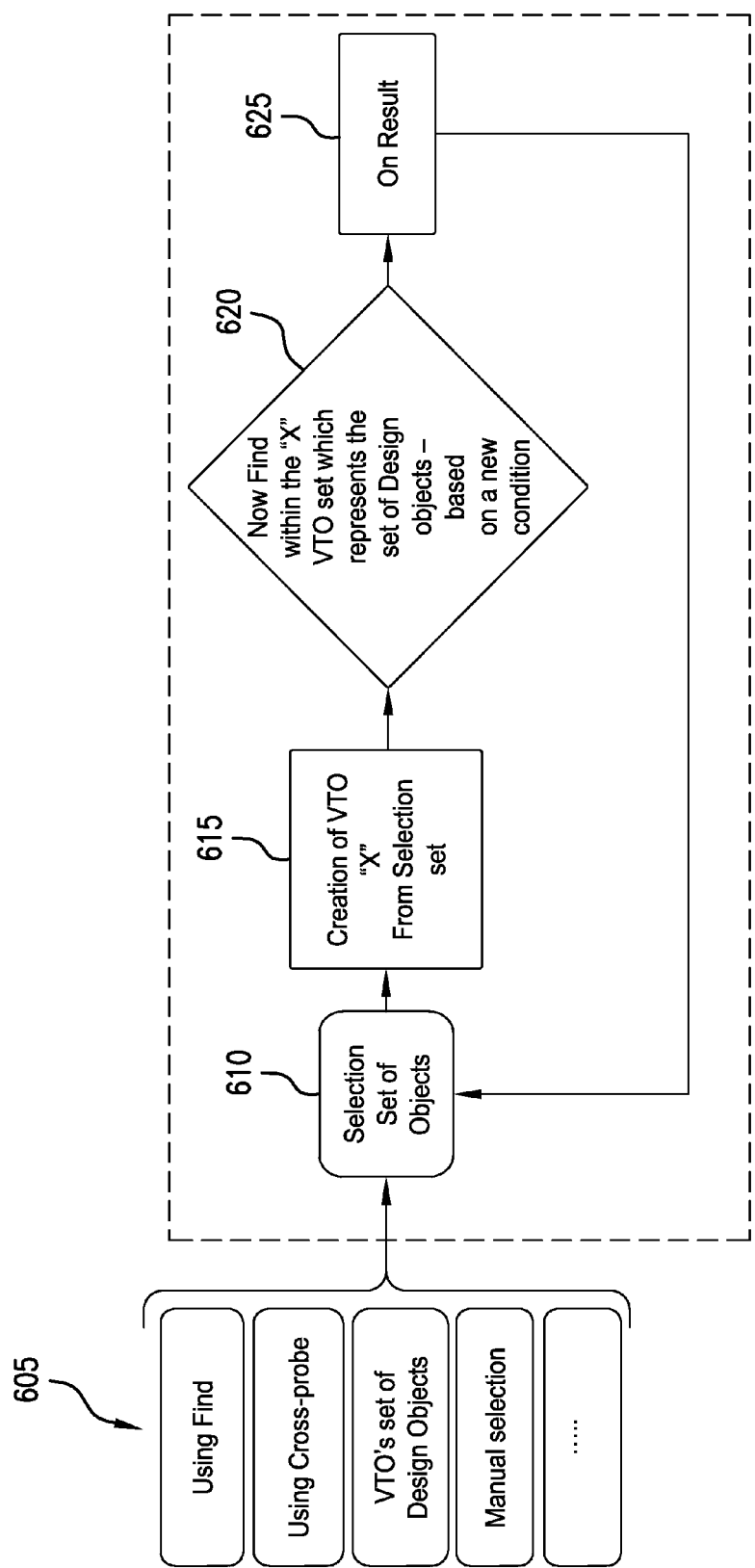
FIG. 6 is a flow diagram of a method for using inter-application overlays, including several different exemplary measures for selecting objects to correlate a VTO with objects of a design file in accordance with an exemplary embodiment of the present invention.

FIG. 6 demonstrates another simplified flow diagram of a method of interacting with a VTO. At block 605, a plurality of different measures to select individual objects in a design file are provided. Such different measures can include a find search, a cross-probe, or a VTOs set of design objects, or a user may simply manually select individual objects, or the like. Alternatively, objects may be automatically selected by a macro or subroutine, for example, to perform a smoke test, whereby simulation results, such as temperatures of components may be overlaid on top of those components to provide a color-coded view of temperatures as results of a simulation. At block 610, the selection set of objects are chosen. At block 615, a subset VTO "X" from the selected set of objects is created. At block 620, a second find operation allowing a user to narrow down the results of the subset "X" is provided. If, for example, the user at block 605 were to use the find command to find all capacitors in the displayed design file, and then at block 620 the user were to then perform a nested find operation to find only the capacitors having a 0.1 micro Farad capacitance, this would then populate the "X" VTO subset with only capacitors having the 0.1 micro Farad capacitance. At block 625, the results may be rendered and displayed in superimposed relation above the native display of a native application such as a physical layout or schematic editor. Such blocks are looped until all of the objects have been rendered.

Figure 7:
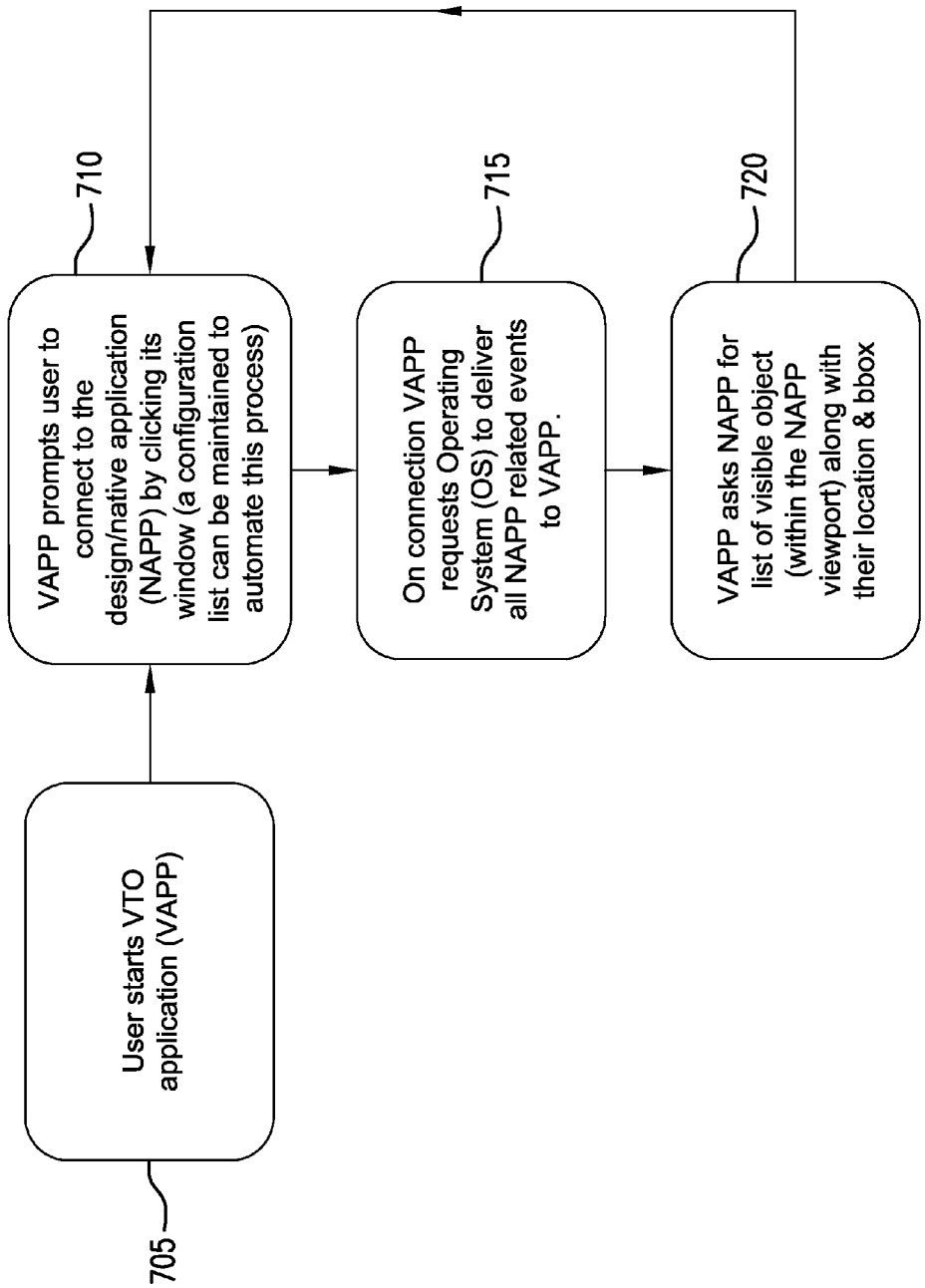
FIG. 7 is a flow diagram of a method for providing an inter-application overlay including an exemplary interaction between a virtual application or overlay application and a native application or underlying design application, in accordance with another embodiment of the present invention.

FIG. 7 is another simplified flow diagram illustrating a simultaneous application approach. In block 705, a user initiates a VTO application (VAPP). The VTO application or VAPP will act as an application window that superimposes itself above another application such as a native application (NAPP). The NAPP is preferably a tool designed to assist a designer in the EDA design flow. More specifically, the NAPP is a schematic capture tool, a layout editor, a routing application, a simulation program, a PCB layout, a die etcher, or any other application used along the tool chain of the EDA design flow. At block 710, the VTO application or VAPP prompts the user, in a preferred embodiment, to choose a design or native application generally, by clicking its window, however, other measures for choosing the native application may be provided. A predetermined configuration list may be provided to automate the process for a particular user or group of users. If, for example, the intended user is a PCB package engineer, then generally the NAPP may be chosen by default to be a PCB layout editor.

At block 715, the VAPP will request the operating system reroute, deliver, or duplicate all of the native application events to the VAPP. Such events may include mouse-overs, scrolls, panning of the display window, zoom events, rotation events, or other such events. At block 720, the VAPP asks the NAPP for a list of visible objects within the NAPP viewport. This may be accomplished via a querying command or an inter-application communication channel pre-established. Alternatively, this may be performed by interrogating a memory location or variables of the NAPP or by visually searching the NAPP viewport and comparing shapes of objects against a library of known component shapes, such as PSPICE model objects or layout model objects. The query may also request the arrangement, location, and bBox of the visible objects. The loop from block 710 through block 715 and to 720 repeats itself continually, continuously updating based on events such as mouse or scroll events to maintain a constant alignment of the contents VAPP window and NAPP window to ensure correlation of annotations or information and the related object within the NAPP.

Figure 8:
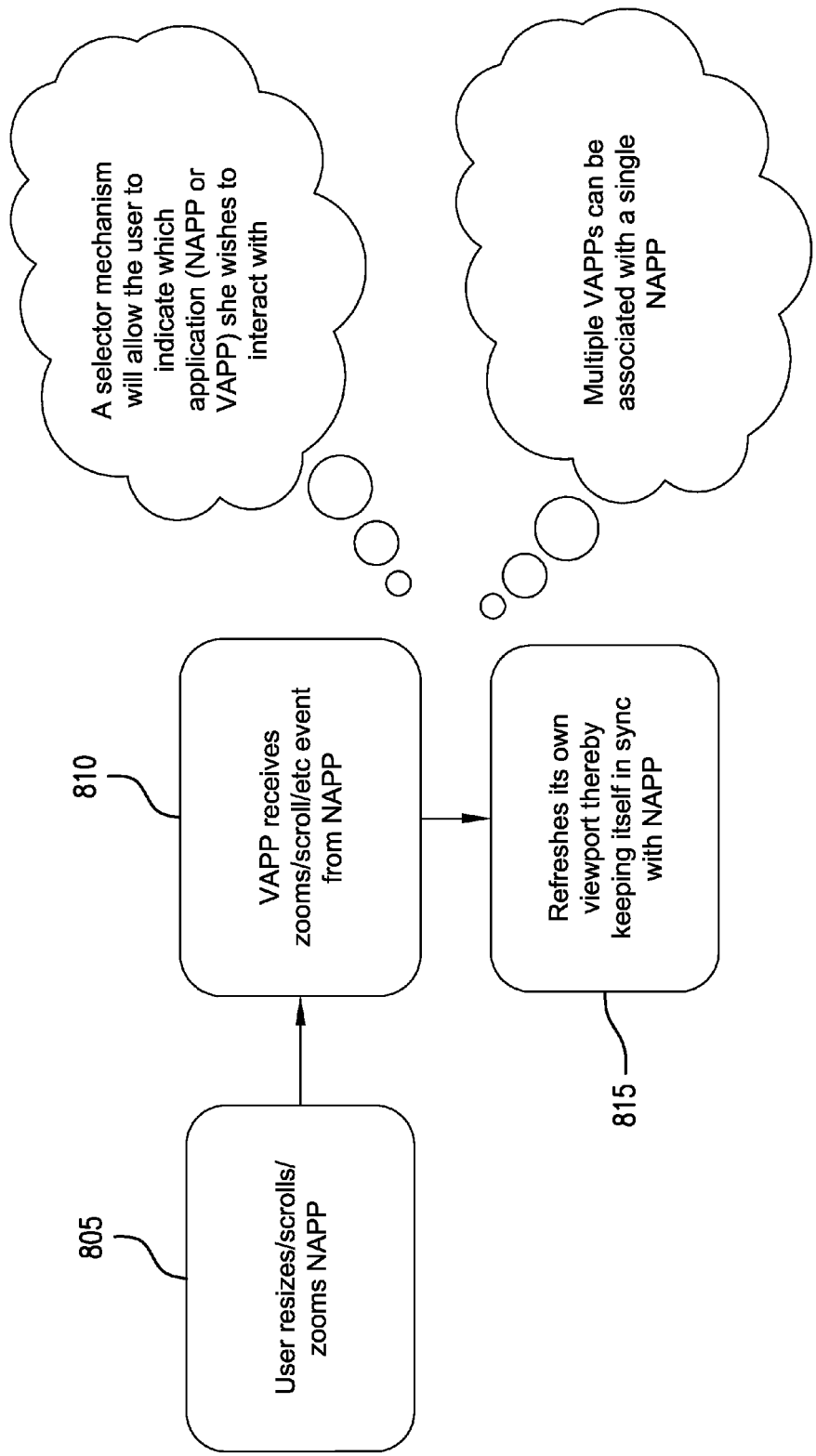
FIG. 8 is another flow diagram of a method for providing an inter-application overlay wherein the native application and virtual application interactions are outlined in a simplified manner in accordance with another embodiment of the present invention.

FIG. 8 is another simplified flow diagram of a method for using and maintaining alignment and correlation between a VAPP and a NAPP to ensure that annotations and information related to the objects of the design file in the NAPP are correlated and aligned correctly with those selected and annotated objects. At block 805, a user resizes, scrolls, rotates, or zooms, the display port of the NAPP. Each of these four actions would be considered an event that will be intercepted by the operating system and redirected at block 810 to the VAPP. At block 810, the VAPP receives the zoom, scroll, rotate, and other such events from the NAPP. At block 815, the VAPP refreshes its own viewport in line and according to the events received from the operating system to thereby keep itself in sync and aligned with the viewport of the NAPP. It is important to note that there is not necessarily merely a one to one relationship between the VAPP and the NAPP. A selector mechanism may allow a user to indicate which application the VAPP should interact with. Multiple VAPPs may be associated with a single NAPP. Thereby, a composite view or display in superimposed relation is provided to the user where multiple VAPPs and/or annotations or information are projected above a NAPP display port. The composite view may be of a plurality of different VAPPs superimposed or projected upon to the design files interconnected objects displayed in the NAPP.

Figure 9:
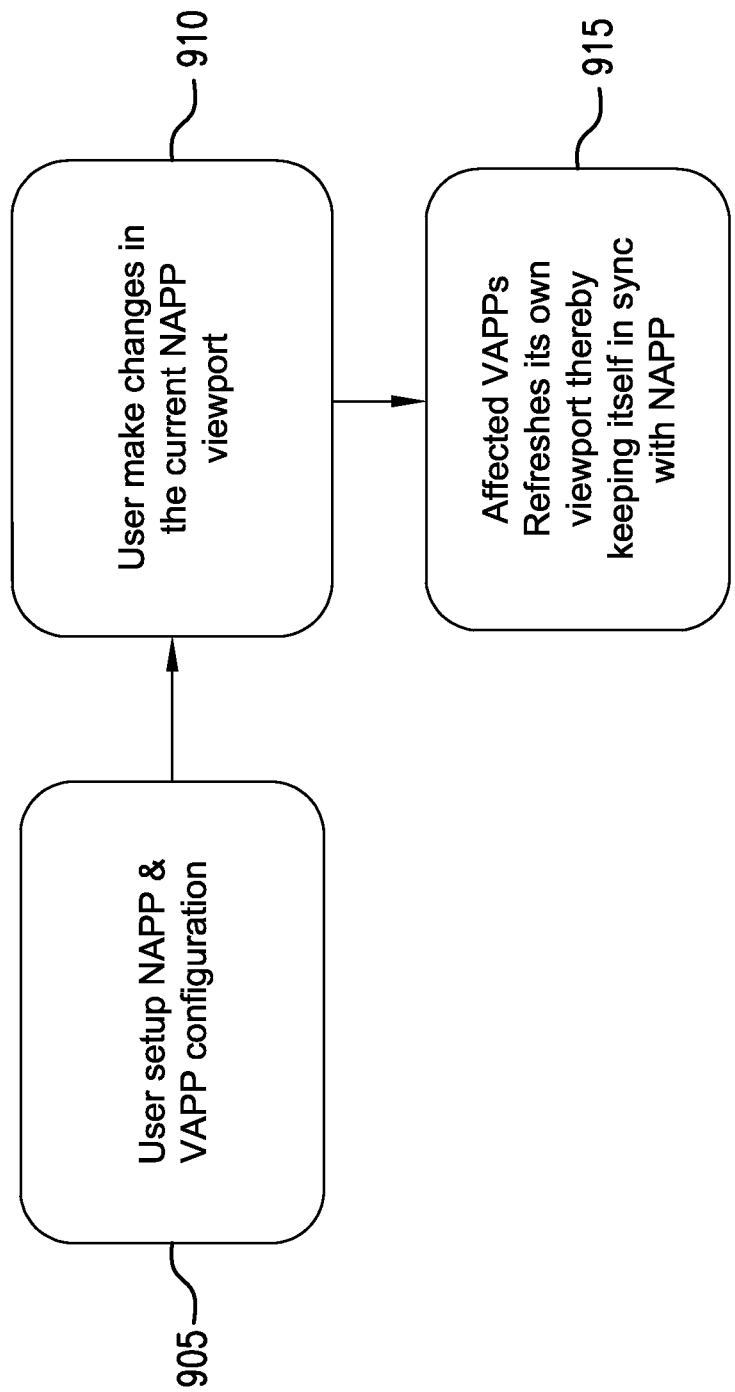
FIG. 9 is another flow diagram of a method for providing an inter-application overlay in accordance with another embodiment of the present invention.

FIG. 9 is another simplified flow diagram illustrating a configuration of a VTO application with reference to a native application in accordance with certain embodiments of the present invention. At block 905, either user sets up and configures both the native application NAPP and VTO application or VAPP. At block 910, the user makes changes in the current NAPP viewport such as scrolling, zooming, or rotating, or any other such manipulation of the NAPP viewport such that an event is triggered and the operating system shares that event with the VAPP. At block 915, the affected VAPPs (one or a plurality) refresh their own viewport responsive to the event received from the operating system to thereby keep each respective VAPP in sync, alignment or correlation with the NAPP.

Figure 10:
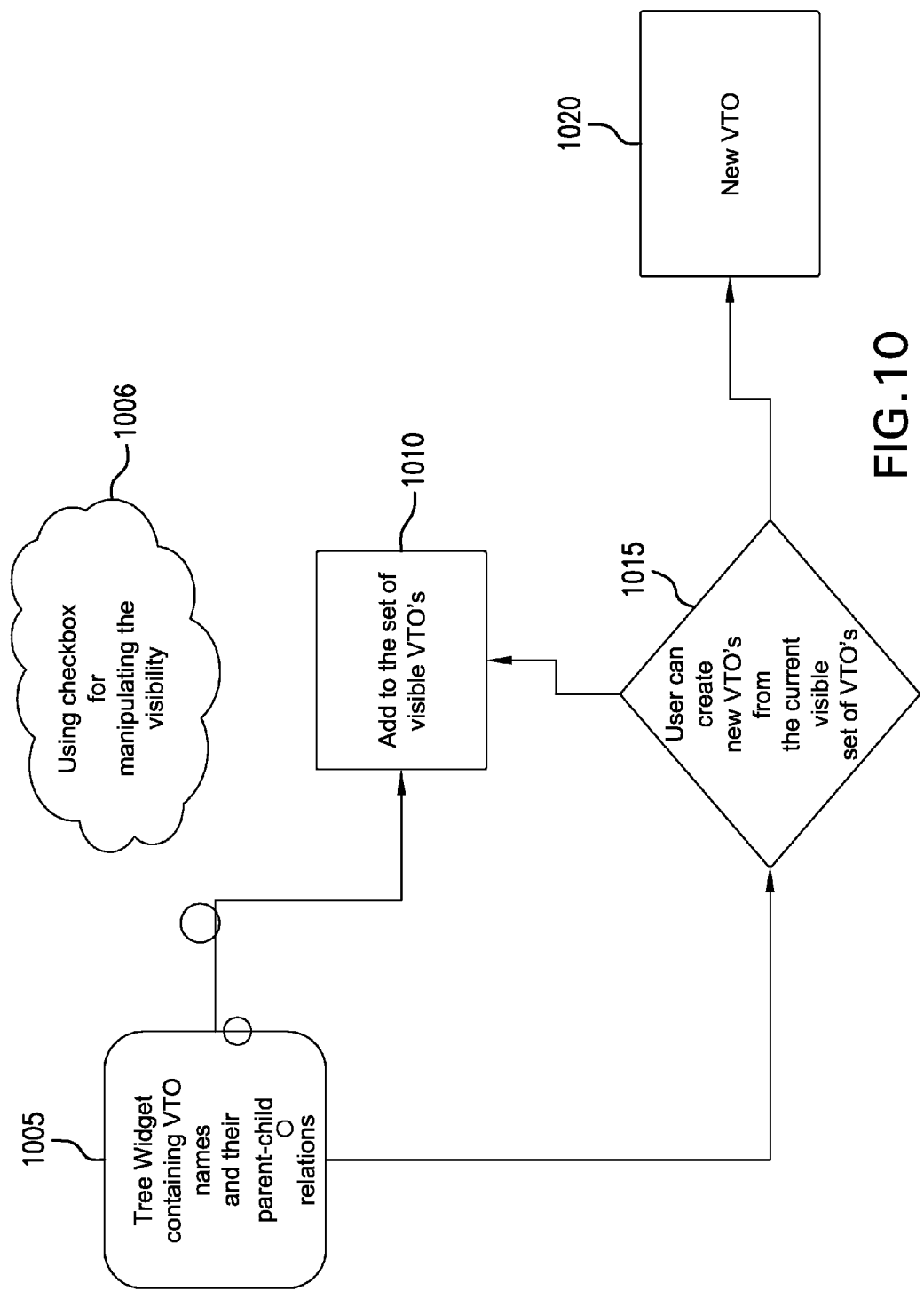
FIG. 10 is a flow diagram of a method for providing inter-application overlays, including an overlay manager for selecting a plurality of different VTOs to form a composite view or a new composite virtual transparent overlay (VTO), in accordance with another embodiment of the present invention.

FIG. 10 is another simplified flow diagram of essentially a multiple VTO or VAPP selection procedure in accordance with certain embodiments of the present invention. At block 1005, a tree widget containing different VTO names and their parent/child relationships are displayed to a user. The user can then choose one or a plurality of different VTOs for different categories of annotations or more specialized for different tasks. At block 1010, the system re-renders the display adding in any VTOs that have been selected to be included in the composite display and removing any of the VTOs which have been deselected.

For example, at block 1005, the user may use a checkbox or other such control to selectively choose amongst a plurality of different VTOs. This is shown at block 1006. At block 1015, a user can create a composite VTO from the currently selected visible set of VTOs that the user has chosen. At block 1020, this new composite VTO of the currently selected visible VTOs is instantiated or created and preferably saved into an overlay file apart from the design file.

Figure 11:
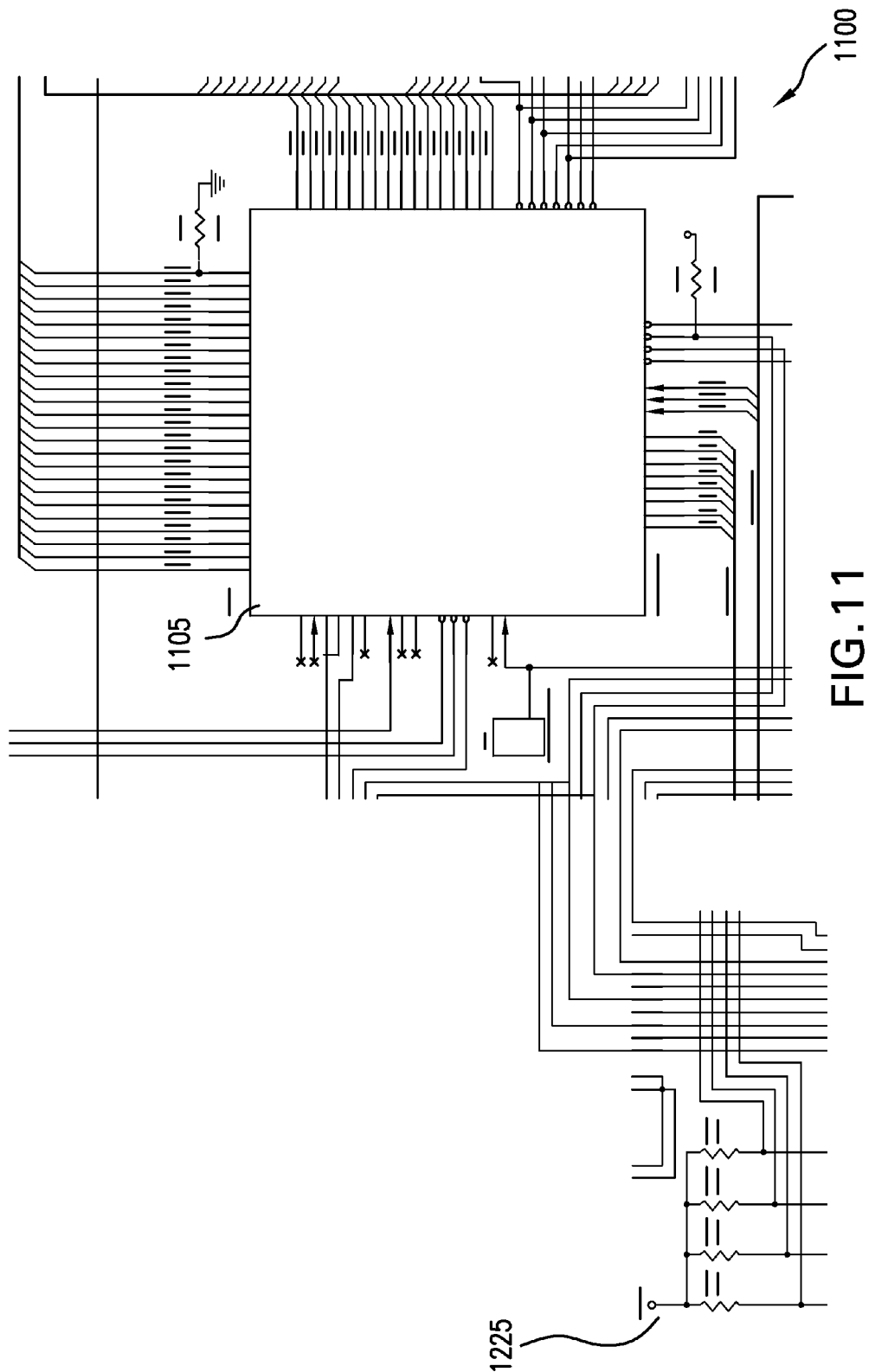
FIG. 11 is an illustrative simplified schematic diagram of a device, design, or integrated circuit which may be used with certain embodiments of the present invention.

FIG. 11 is a simplified schematic diagram of an illustrative or exemplary integrated circuit, design, PCB, or device. Such an integrated circuit or device may be used with any of the tools in the EDA tool chain along the design flow. Integrated circuit 1100 may be contained in the design file which may have selective write access but may have promiscuous read access to allow any of the designers to read from the file while disallowing the majority or unsecured users from having write access thereto. The device 1100 stored in the design file is displayed herein with a plurality of different objects such as a central processor 1105.

Figure 12:
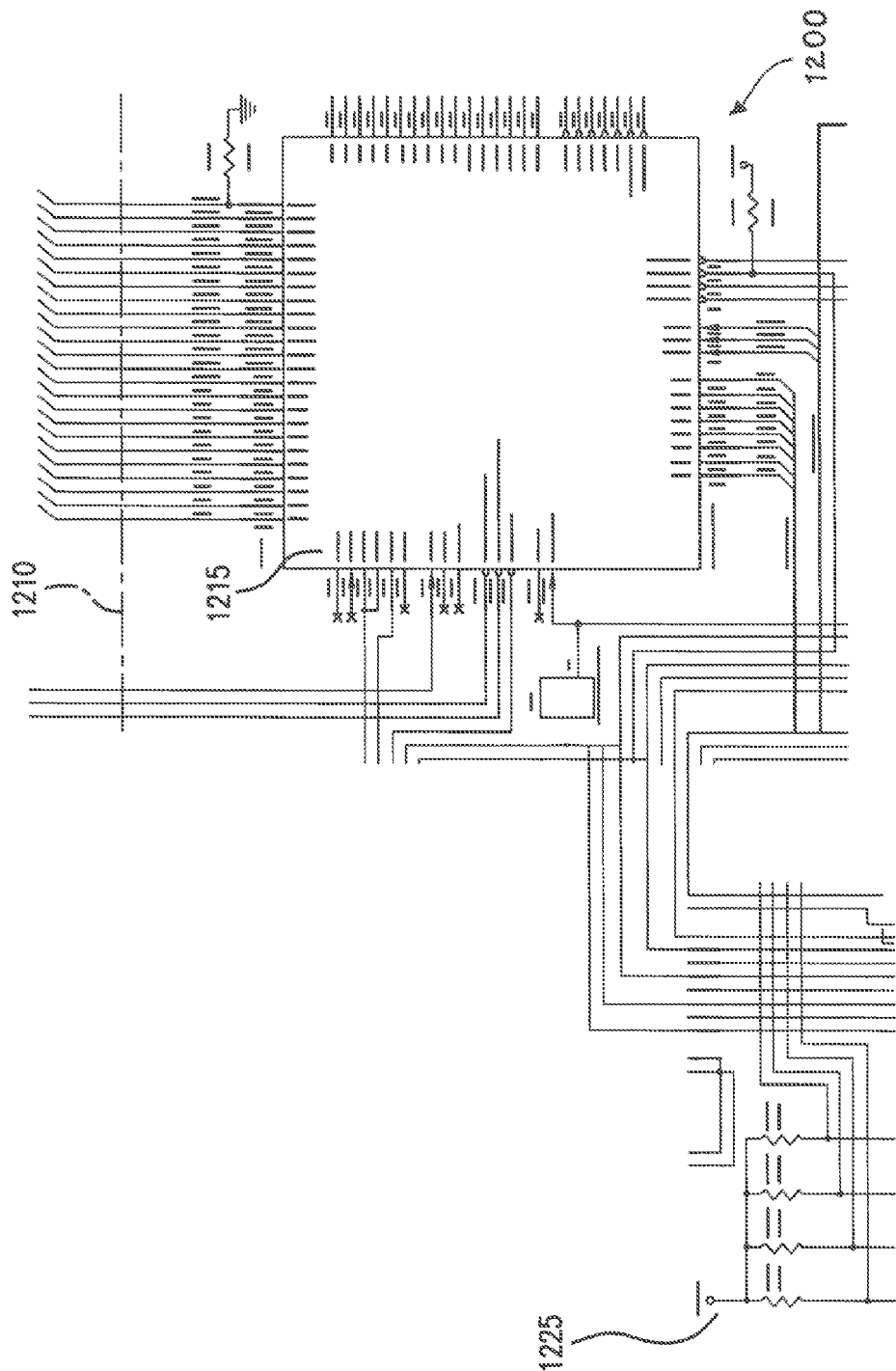
FIG. 12 is an illustrative schematic diagram of a design or integrated circuit as seen in FIG. 11 with an overlaid VTO or inter-application overlay superimposed above and in correlation with the simplified schematic diagram in accordance with an embodiment of the present invention.

FIG. 12 is an exemplary composite display generated by combining an underlying design file of an integrated circuit 1200 combined with a first VTO containing additional annotations, implied connectivity, pin names, and other such information, for example, seen in the pin names of 1215 and the implicit connectivity of 1210. Another implicit connection is shown at 1225. It is seen that the VTO provides additional information and annotations to the underlying design file. Of importance is the maintaining of alignment between the VTO and the integrated circuit of the design file such that the pin names 1215 and implicit connectivity 1225 are maintained. Advantageously, a user is able to disengage or deselect the VTO as seen and the underlying integrated circuit of the design file will be displayed as seen in FIG. 11 without the annotation's implicit connectivity and other such information contained in the VTO.

Figure 13:
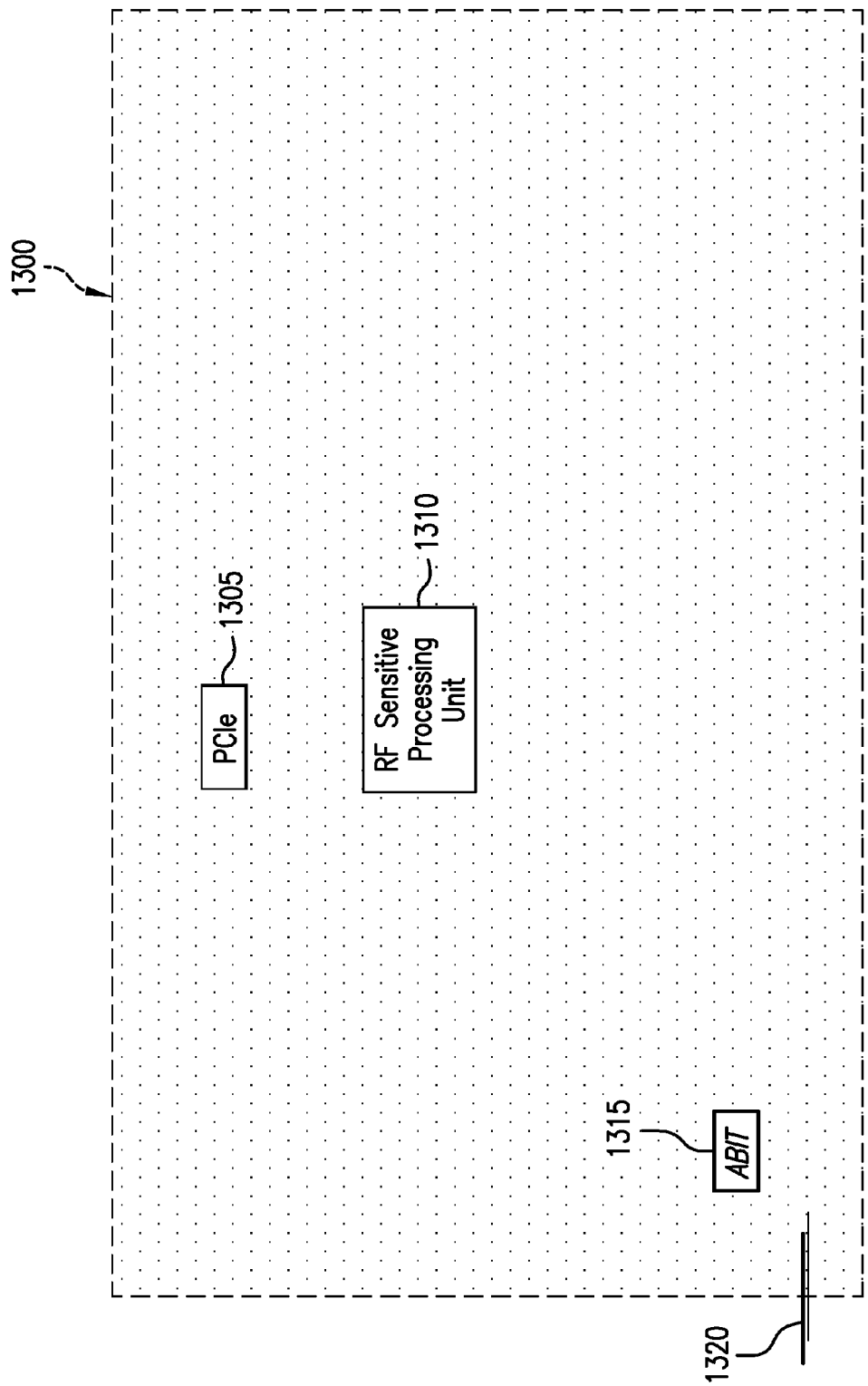
FIG. 13 is an illustrative virtual transparent overlay (VTO) or inter-application overlay created, modified, or utilized in certain embodiments of the present invention.

FIG. 13 is a very simplified exemplary VTO containing labels for different portions of the underlying circuit. As seen, the VTO 1300 may have a plurality of different labels such as PCIE 1305, an RF sensitive processing unit warning 1310, and an abit box indicating a portion of the component 1315. Additionally, implicit connectivity 1320 may be made explicit in the VTO for the designer's benefit.

Figure 14:
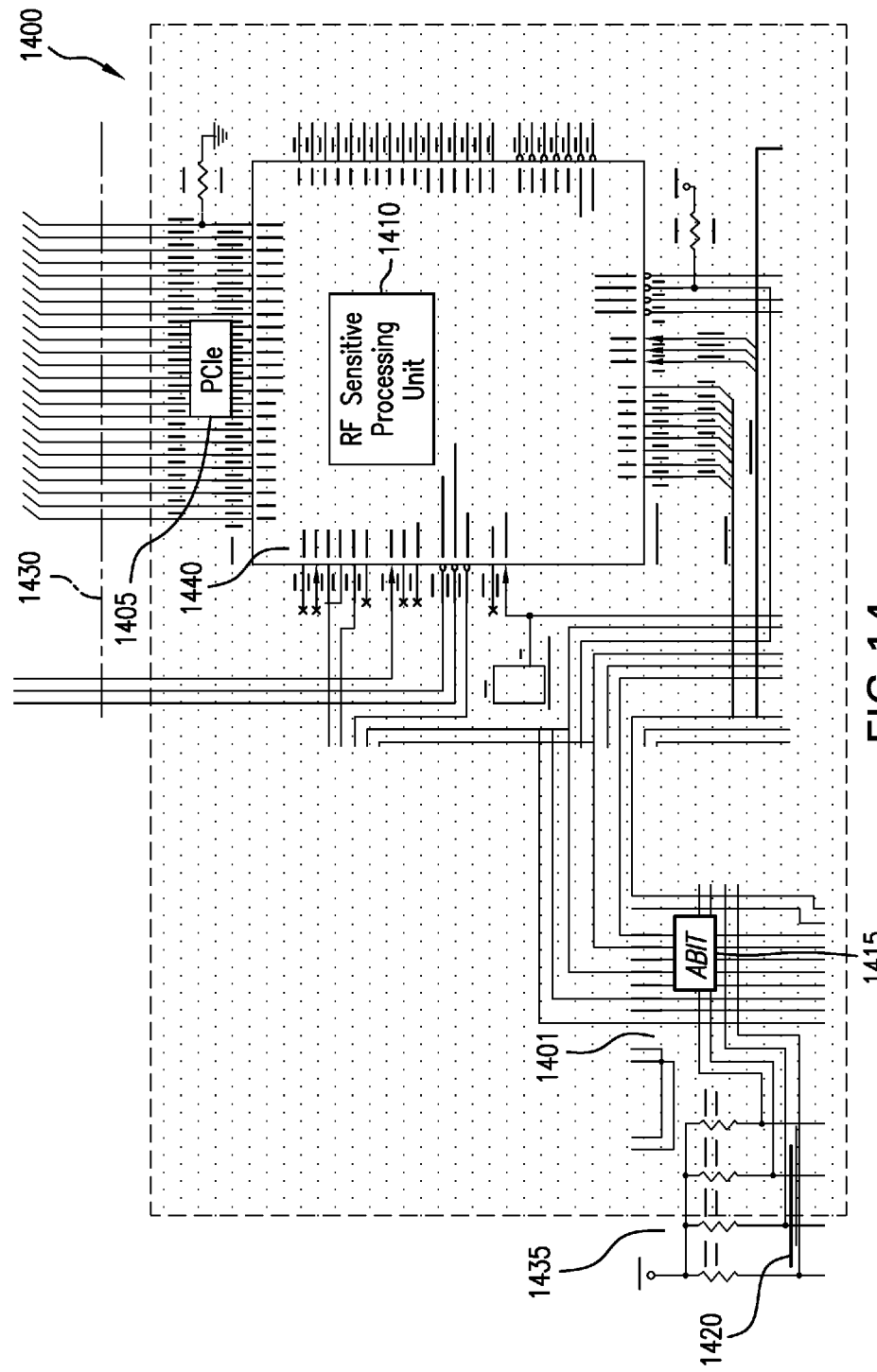
FIG. 14 is an illustrative composite display of a plurality of different VTOs or inter-application overlays as seen in FIGS. 12 and 13 superimposed over a representation of the design file of the integrated circuit as seen in FIG. 11, as produced in accordance with certain embodiments of the present invention.

FIG. 14 is another composite view generated by combining an underlying integrated circuit 1400 in the design file as seen in FIG. 11 with the VTO overlaid in FIG. 12 and the VTO of FIG. 13. An example of the text annotations of the VTO 1 of FIG. 12 are seen in the annotations of 1440. Another exemplary annotation of the VTO 2 as seen in FIG. 13 is shown at the annotation of 1410. Another annotation PCIe 1405 is seen overlaying the PCIe interface of the processor. An implicit connection 1430 from VTO 1 of FIG. 12 is shown as well traversing across the upper PCIe 1405 portion of the processor interface. Yet another annotation from VTO 2 seen in FIG. 13 is seen in the ABIT 1415 annotation and the implicit connectivity 1420 is shown as well. Another implicit connectivity portion 1435 is displayed as well, as is a portion of VTO 2 seen in FIG. 13, the sectional divisor 1401.

In this manner, designers along the EDA design flow are able to communicate important messages that relate to individual objects or components of the design from one user and one tool to another user and potentially a different tool. The EDA design flow is not only a linear progression from a logical high level abstraction schematic through more and more iterative steps to a physical layout and eventually to an actual silicon realization, but there is a recursive nature to the process whereby different tools and different designers may see the design again and need to modify and take into account annotations from different steps along the design flow. Thereby, with a plurality of different VTO layers, annotations relevant to a specific task along the design flow may be contained within their own VTO layers such that information is selectively provided to those who need it on a relevance basis only and the design is not cluttered.

FIG. 15 is yet another VTO indicating a connector 1505, an RF sensitive unit communication 1510 to a subsequent design step such as routing or PCB layout. The annotation 1510 may serve as a warning or an inter-process inter-user inter-application communication of a warning or constraint. Annotation 1515 may be a box or a highlighted portion is shown to annotate which portion of the integrated circuit is a power circuitry. Within that annotation, there is another annotation PC1 1520 which may demarcate a portion of the power circuitry. Annotation 1515 may indeed be a highlighted color 1525 such as yellow or any such color able to distinguish a portion so as to draw attention, provide an information, or a warning.

Figure 16:
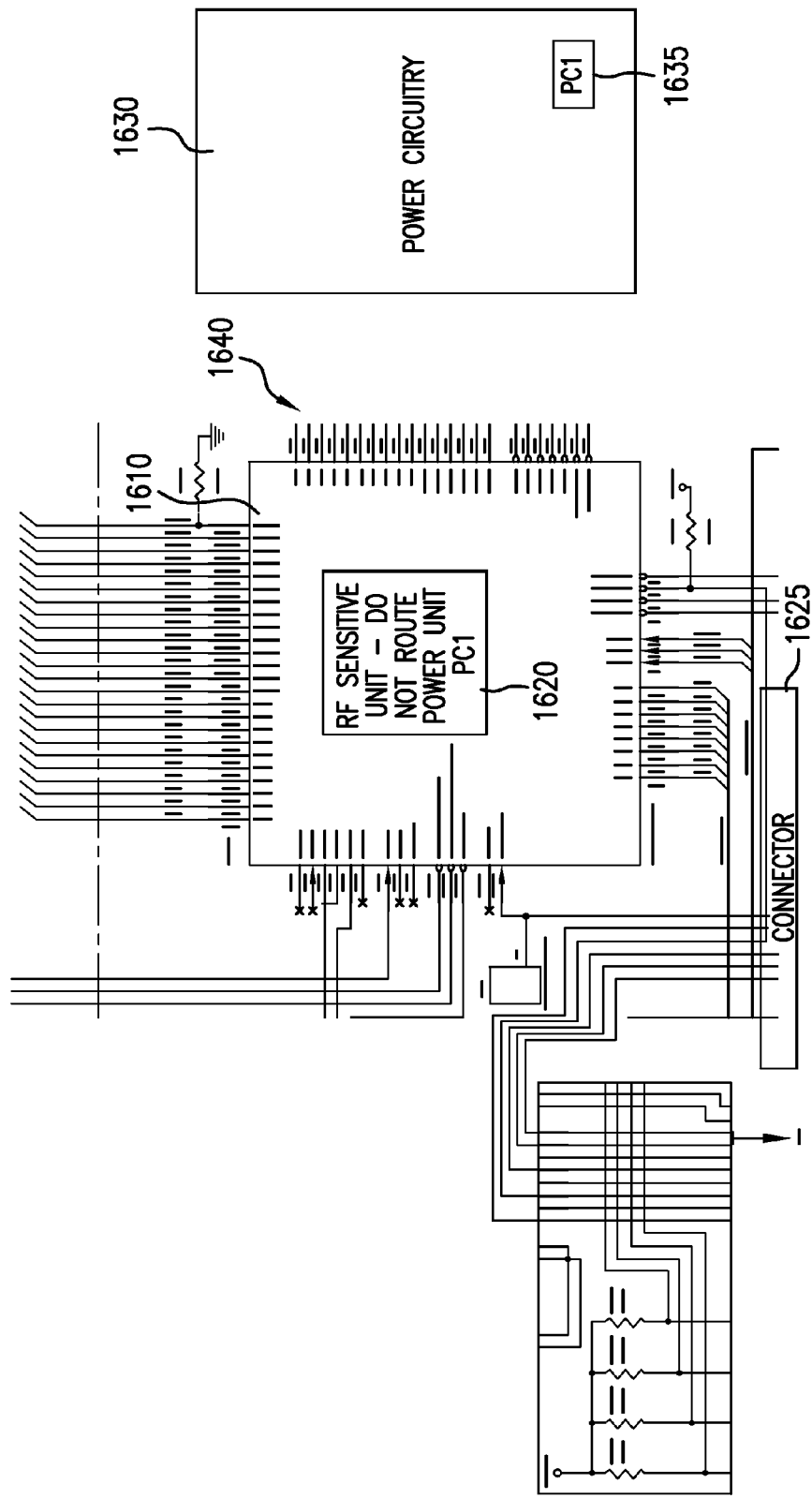
FIG. 16 is another illustrative composite display generated from the combination of a representation of the underlying design file and a plurality of different VTOs or inter-application overlays, created in accordance with certain embodiments of the present invention.

FIG. 16 is another composite view of the underlying integrated circuit of the design file overlaid in superimposed relation or projected thereupon with two different VTOs: a first VTO including pin layouts 1610 and a second VTO having annotated callouts or section demarcations 1620 such as the RF sensitive unit—do not route power unit PC1. In this manner, a designer in the physical layout or PCB package engineer may be able to combine multiple different VTOs to arrive at the unique combination of information that they need to effectively perform their design task along the EDA design flow. Several other demarcation annotations such as connector 1625, PC1 1635, and power circuitry 1630, are provided as well to generate the composite view 1640.

Figure 17:
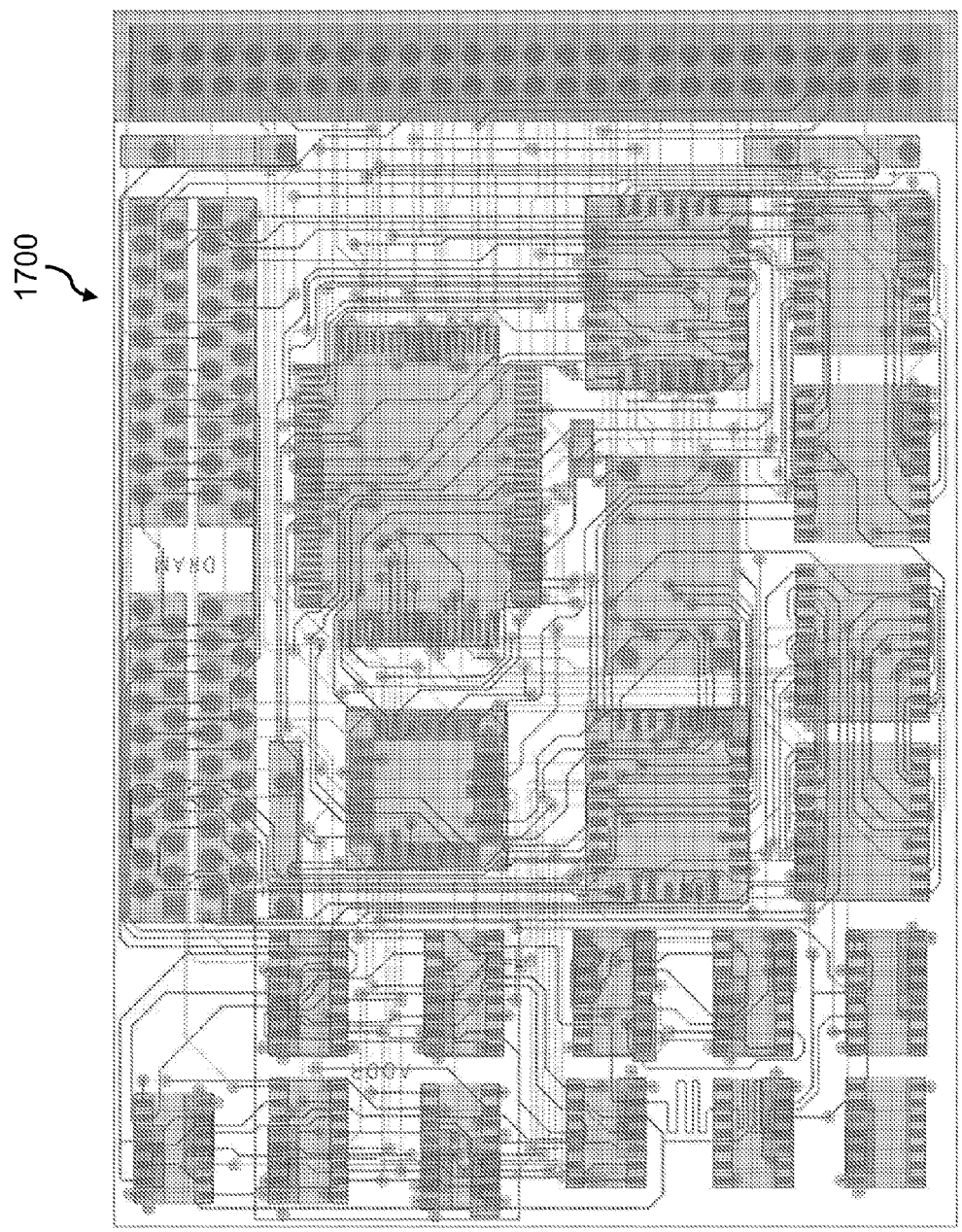
FIG. 17 is an illustrative physical layout including accurate physical dimensionality and an actual representation of an integrated circuit to be produced, in accordance with certain exemplary embodiments of the present invention.

FIG. 17 is an illustrative example of a physical layout transformed from the logical schematic of FIG. 11. The physical layout 1700 takes into account physical constraints in establishing the routing between pins of components, the placement of those components, their physical dimensionality, parasitic capacitances, resistances, inductances, and the like such that the logical schematic of FIG. 11 is transformed into a more practical, actual physical layout that accounts for practicalities, constraints, and necessities in the design.

Figure 18:
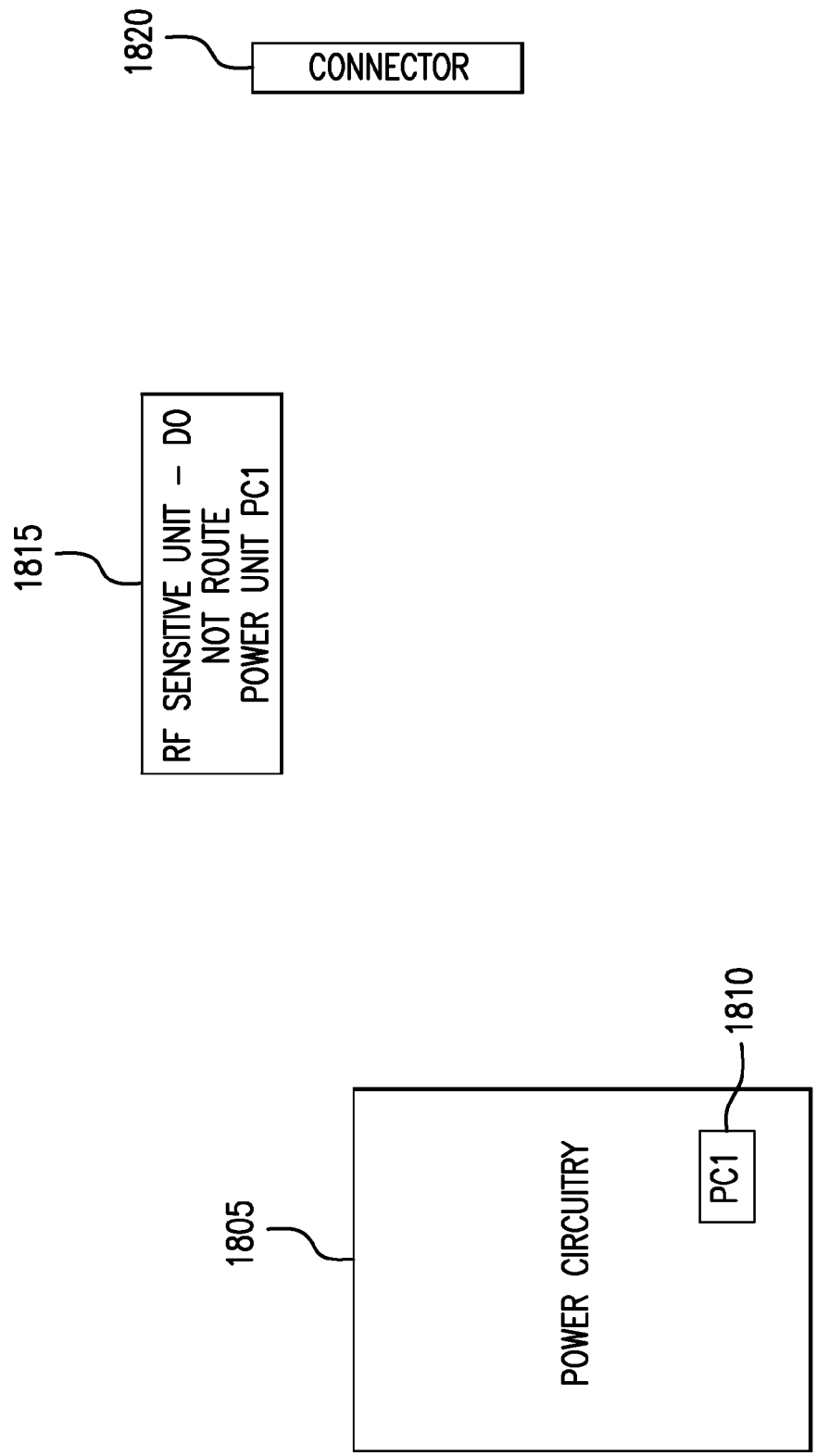
FIG. 18 is an illustrative transformed VTO or inter-application overlay related to FIG. 15, transformed in accordance with certain embodiments of the present invention.

FIG. 18 is a transformed VTO (from the logical to the physical domain), showing several annotations which may be passed on from the logical schematic designer, potentially to a physical layout, PCB package, silicon realization engineer, or any other subsequent stage designers along the EDA design flow. It is shown that there is a power circuitry annotation demarcation block 1805, a PC1 power connector block 1810, an RF sensitive unit 1815 with a warning not to route power unit PC1 1810 through this portion of the physical layout. This annotation 1815 may serve as a warning or a means of communicating between different designers and different stages of the EDA design flow. Lastly, there is another annotation connector 1820 which also may be utilized by subsequent designers in the EDA design flow. As the underlying representation of the design flow has been transformed from logical (FIG. 11) to physical (FIG. 17), such transformation must be accounted for to maintain correlation and alignment of the VTOs. Thus, the VTOs are transformed to correspond to the representation of the device.

Figure 19:
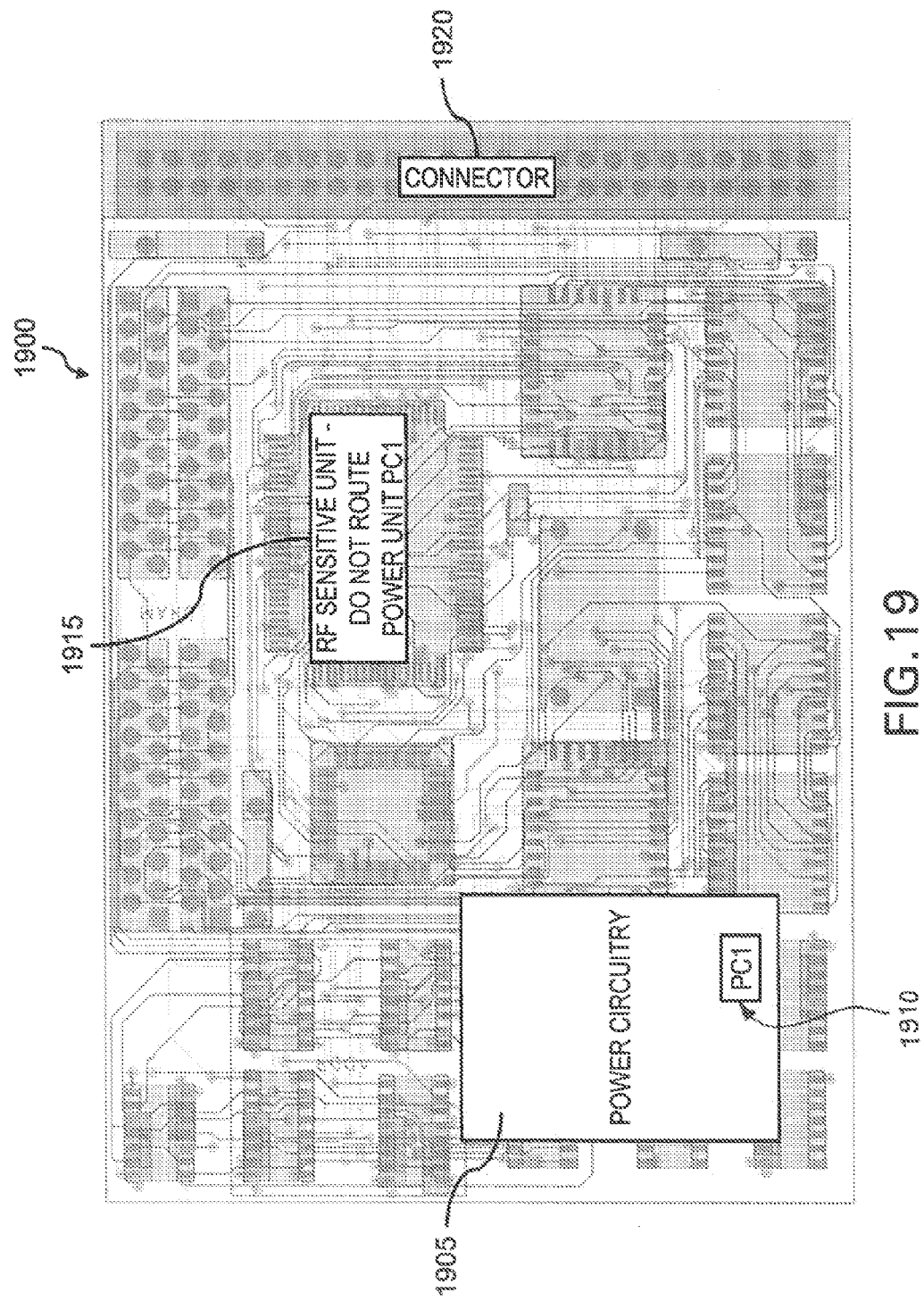
FIG. 19 is an exemplary composite display generated by a combination of the underlying design layout as seen in FIG. 17 and at least one other virtual transparent overlay (VTO), such as the exemplary one illustrated in FIG. 18, and produced in accordance with certain embodiments of the present invention.

FIG. 19 is another composite view of a combination of the underlying physical layout 1900 overlaid by the VTO 1 in superimposed relation containing the annotations such as RF sensitive unit 1915, the power circuitry annotation 1905, the PC 1 annotation 1910, and the connector annotation 1920. In this manner, a designer is able to communicate to subsequent designers in subsequent stages of the EDA design flow that, for example, the processor unit is Radio Frequency (RF) sensitive and thus, the power unit PC 1 may interfere with normal operation of such.

Figure 20:
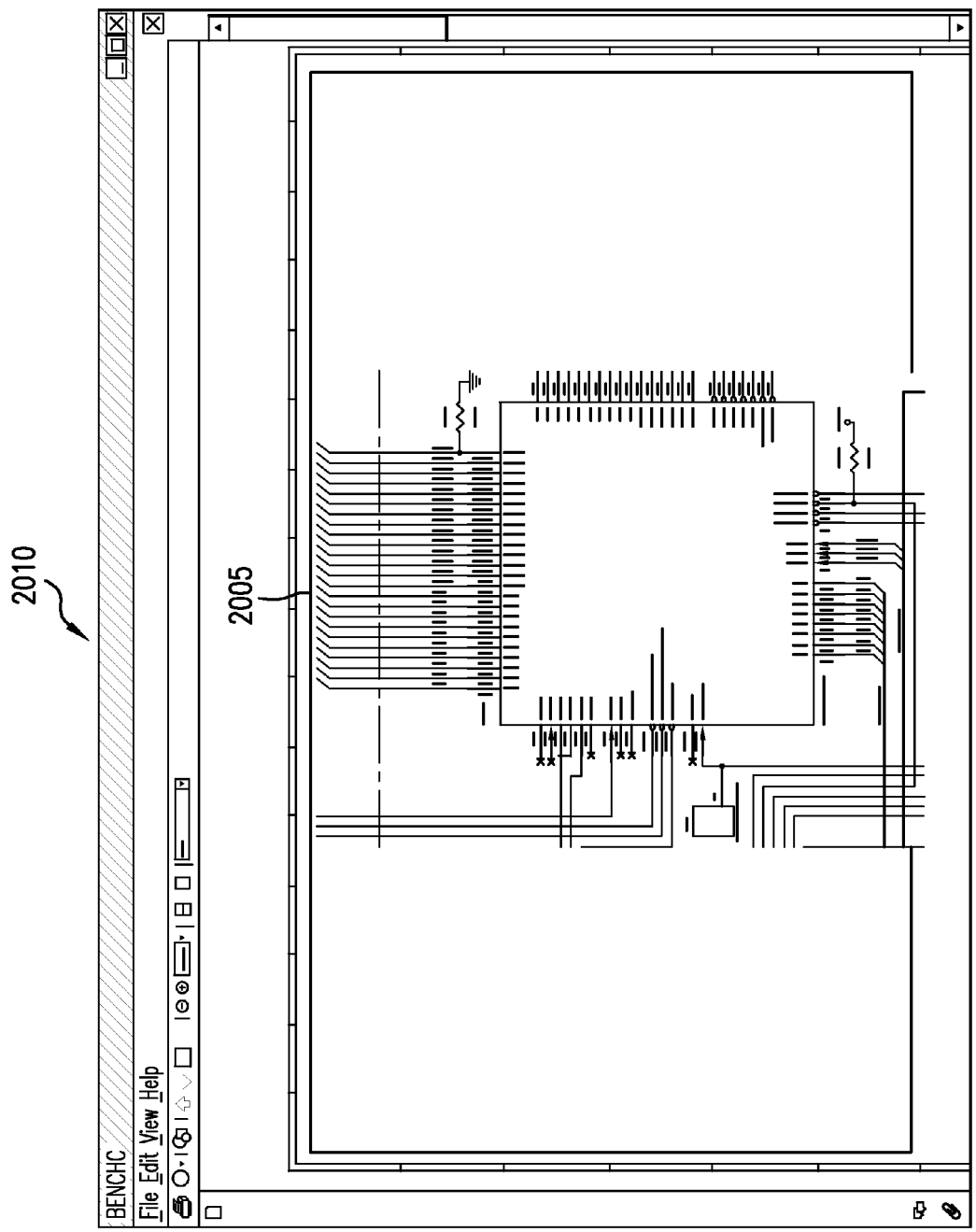
FIG. 20 is an illustrative screen shot of an application used in accordance with certain embodiments of the present invention.

FIG. 20 is an exemplary screen shot of a native application 2010 displaying an exemplary integrated circuit schematic 2005, such as that seen in FIG. 11 or 12. The application or EDA tool 2010 may be considered a native application (NAPP).

Figure 21:
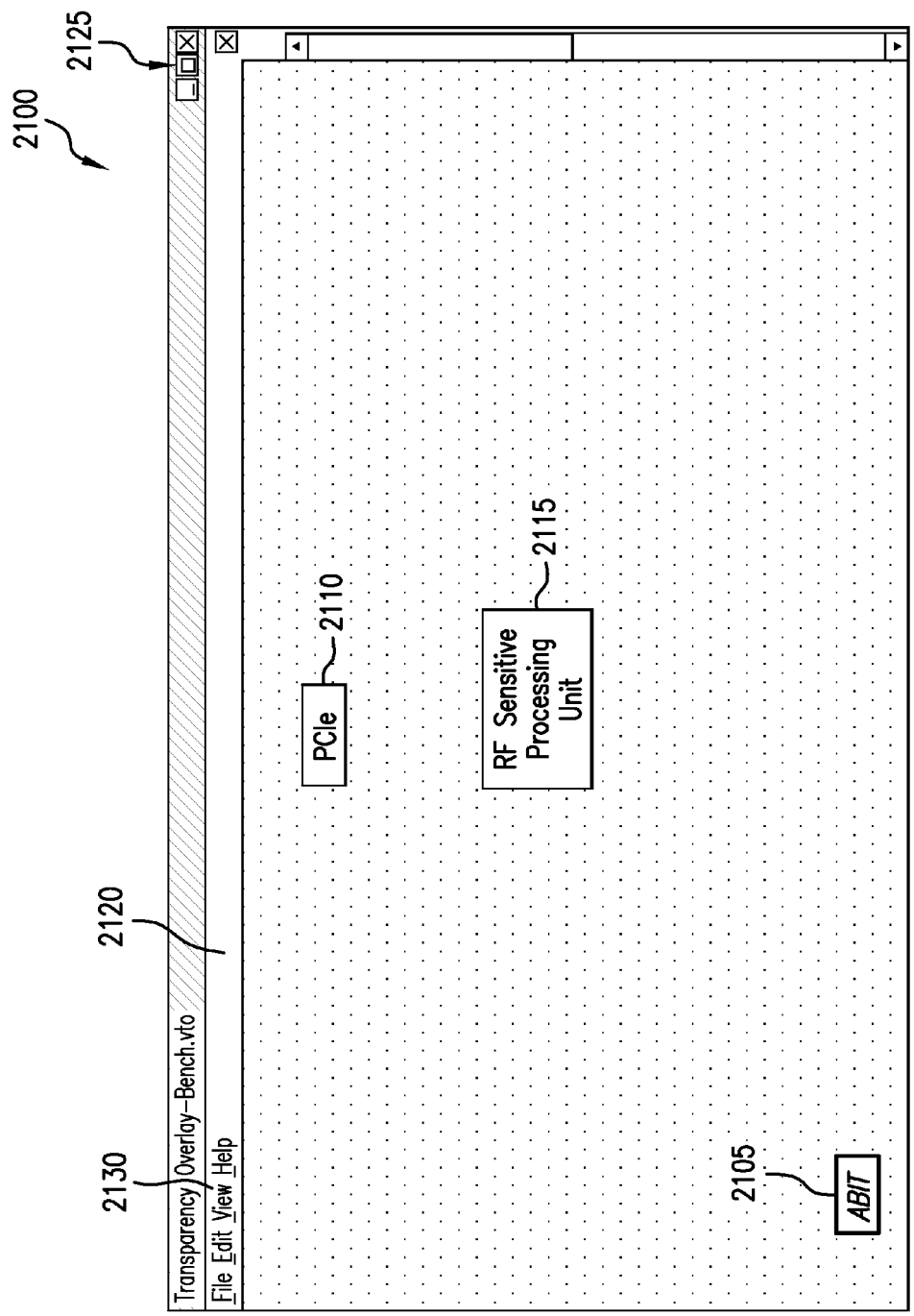
FIG. 21 is an exemplary screen shot of a VTO application (VAPP) or overlay application in accordance with certain embodiments of the present invention.

FIG. 21 is an exemplary screen shot of a VTO application (VAPP) or virtual transparent overlay application 2100. The VTO application (VAPP) may take the form of a separate application window having independent controls such as the view command 2130 *n* the spanner bar 2120. The VAPP window may also have a maximize function 2125 which will maximize the display of the VAPP to be either full screen or a maximized window taking up the substantial entirety of the display screen. Within the VAPP, there is displayed at least one VTO having annotations such as PCIe 2110, RF sensitive processing unit 2115, and ABIT 2105. These annotations correspond with the annotations shown in the VTO in FIG. 13. Generally, the scale, orientation, and portion of the VTO displayed will correspond with that of the native application (NAPP) as seen in FIG. 20 such that annotations 2110, 2115, and 2105 are aligned and co-related with the underlying design of the native application, thereby providing context.

Figure 22:
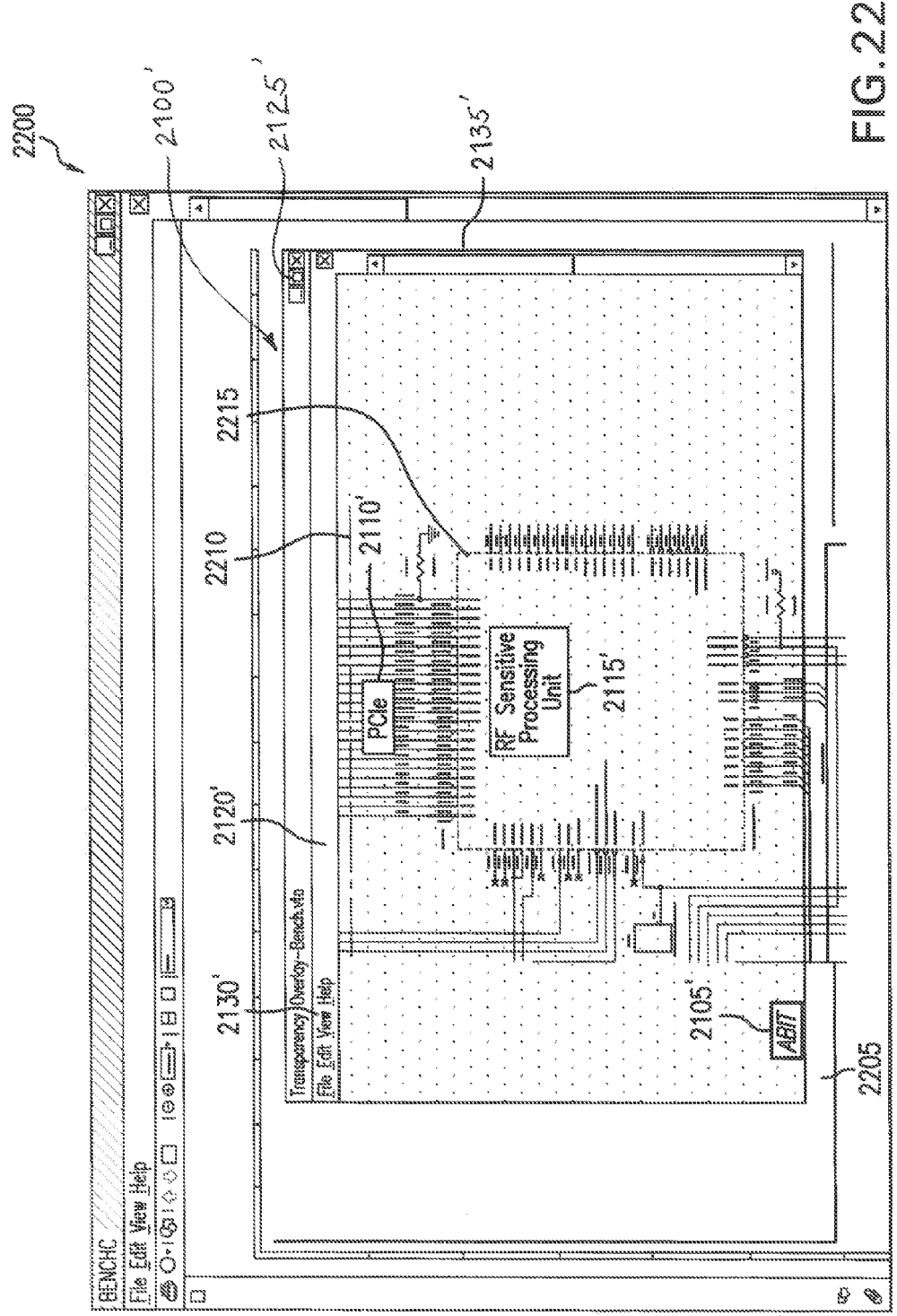
FIG. 22 illustrates an exemplary screen shot of the VAPP being disposed in overlaid relation above a native application (NAPP) in accordance with certain embodiments of the present invention.

FIG. 22 is an exemplary screen shot of a composite view of both a native application or NAPP 2200 overlaid by a VAPP or virtual transparent overlay application 2100'. VAPP 2100' is disposed in superimposed relation over top of the NAPP 2200. VAPP 2100' has a main portion of the window which is transparent and allows at least one VTO to be displayed therein. The VTO may be composed almost entirely of transparent area with just the annotations such as ABIT 2105', RF sensitive processing unit 2115', and PCIe 2110', occluding the view of portions of the underlying integrated circuit of the design file displayed in the NAPP. For example, the PCIe annotation 2110' overlays the portion of the integrated circuit displayed therethrough 2210 which is, for example, a logical schematic of a PCI express bus portion. Similarly, the RF sensitive processing unit 2115' annotation of the VTO in the VAPP overlays and occludes a portion of the actual processing unit 2215 of the design file displayed in the NAPP 2200. As another example, the ABIT 2105' annotation overlays the actual ABIT logical representation 2205 as seen in the integrated circuit of the NAPP 2200.

The VAPP may indeed have a plurality of controls such as the view control 2130' disposed in the spanner bar 2120' or the maximize command 2125'. Inasmuch as annotations should correspond spatially with the underlying design, it is preferred that the VAPP intercept or duplicate events from the native application such as pan, scroll, zoom, and rotate, so as to mirror those same events in the VAPP as in the NAPP, such that the annotations maintain correspondence with the actual portion of the design which they are intended to annotate. Further, the events occasioned upon the VAPP such as a maximize command 2125', a scroll command 2135', or even a movement of the window 2100' should be captured and accordingly the VTO should be modified or translated to provide an aligned view with the displayed design of the NAPP.

Figure 23:
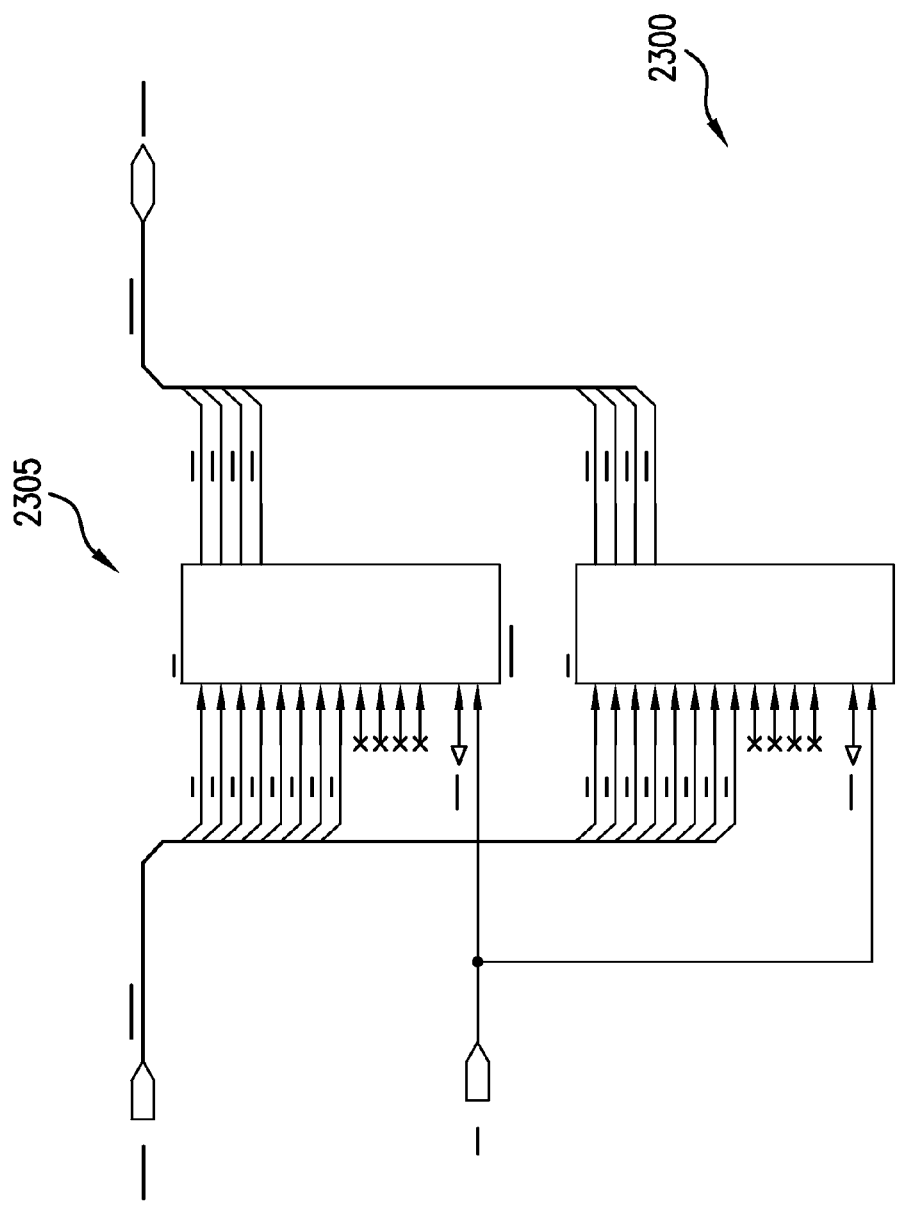
FIG. 23 is an exemplary legacy design layout as operated upon and transformed in certain embodiments of the present invention.

FIG. 23 is an exemplary legacy design file containing an integrated circuit 2305. The legacy design 2300 may include a logical representation of integrated circuits, components, and objects. A file containing the design may also include a plurality of alternative representations of the same circuit, such as a physical layout, a design under test embodiment, and/or a silicon realization design. Alternatively, a legacy design may simply be a captured physical drawing or schematic and may not have metadata relating each object, the connection, the net lists, and other such information, but merely may be a graphical image. In this case, difficulties may be experienced as there, initially, is no information available about the individual components.

Figure 24:
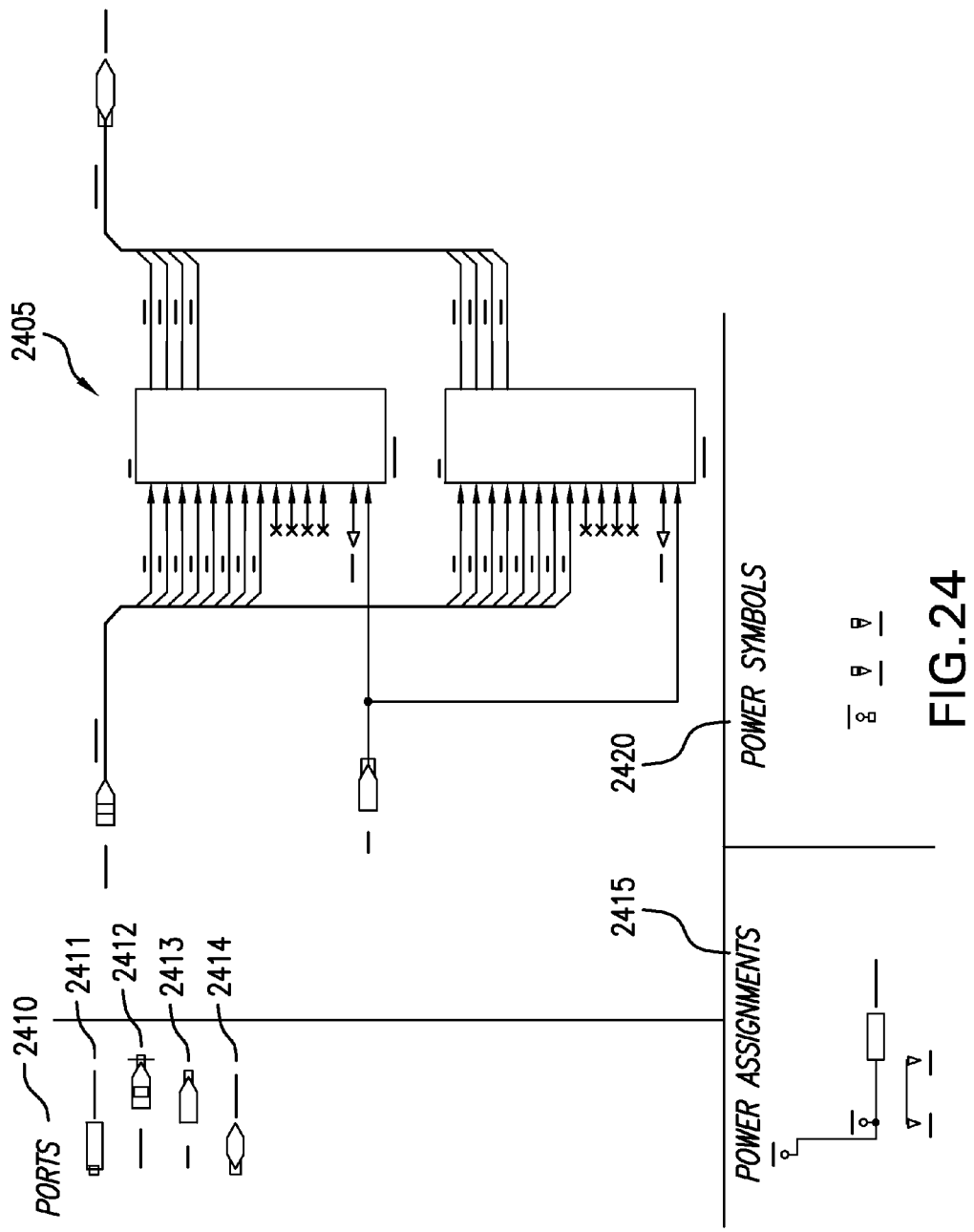
FIG. 24 shows an exemplary transformed legacy layout to include an automatically generated overlay to mandate conformance with design rules, produced in accordance with certain embodiments of the present invention.

FIG. 24 is an illustrative composite view of a circuit design 2405 overlaid with a VTO that, in a preferred embodiment, is automatically generated by graphically (or querying if metadata is available) reading the design 2405 and scanning for several different predefined types of objects contained in the design 2405. Among these types of predefined objects are ports 2410, power assignments 2415, and power symbols 2420. Within the ports type of predefined object, there is shown a backup port 2411, a bus having seven channels A[0 . . . 7] 2412, a WE port 2413, and another address bus AD[0 . . . 7] 2414. Preferably, the design 2405 is scanned to find each of the ports 2411 through 2414 and each instance is copied into a predefined portion of a VTO. In this manner, a design, and in particular, a legacy design, may be transformed into a standard style template for quick reference and readability to have specific types of objects in specific locations. For example, the ports 2410 of a particular template style may be delegated to be in the far left-hand corner of the template. Another type of predefined object may be the power assignments 2415 which may similarly be scanned, identified, and duplicated into the VTO. Within the VTO, the power assignments may be assigned to a lower left hand corner for readability and compatibility purposes. Yet another type of predefined objects are the power symbols 2420 and after scanning the design 2405, identifying, and duplicating such ports into the VTO, they may be assigned to a lower medial portion as seen in the power symbol section 2420. Further, a portion which stores (graphically or otherwise) information relating to the design may be assigned to the lower right hand corner (not depicted in FIG. 24). Such information may include the name of the company or the drafter of the design, a title of the design, a size, revision, date, and/or any other information pertaining to the design that may be relevant. In this manner, adherence to standard template styles may be enforced either during creation of the design, or post hoc for a legacy design prior to the establishment of a template. In the case where the template adherence is being enforced during creation of the circuit, the NAPP may work in concert with the VAPP to identify additions, modifications, and/or deletions to the design 2405 and correspondingly add, delete, or modify ports in the VTO. In such a non-legacy design, the reference, unique ID (UID), or object ID may be referenced in the design file to automatically extract and populate the predefined portions of the VTO for such objects.

Figure 25:
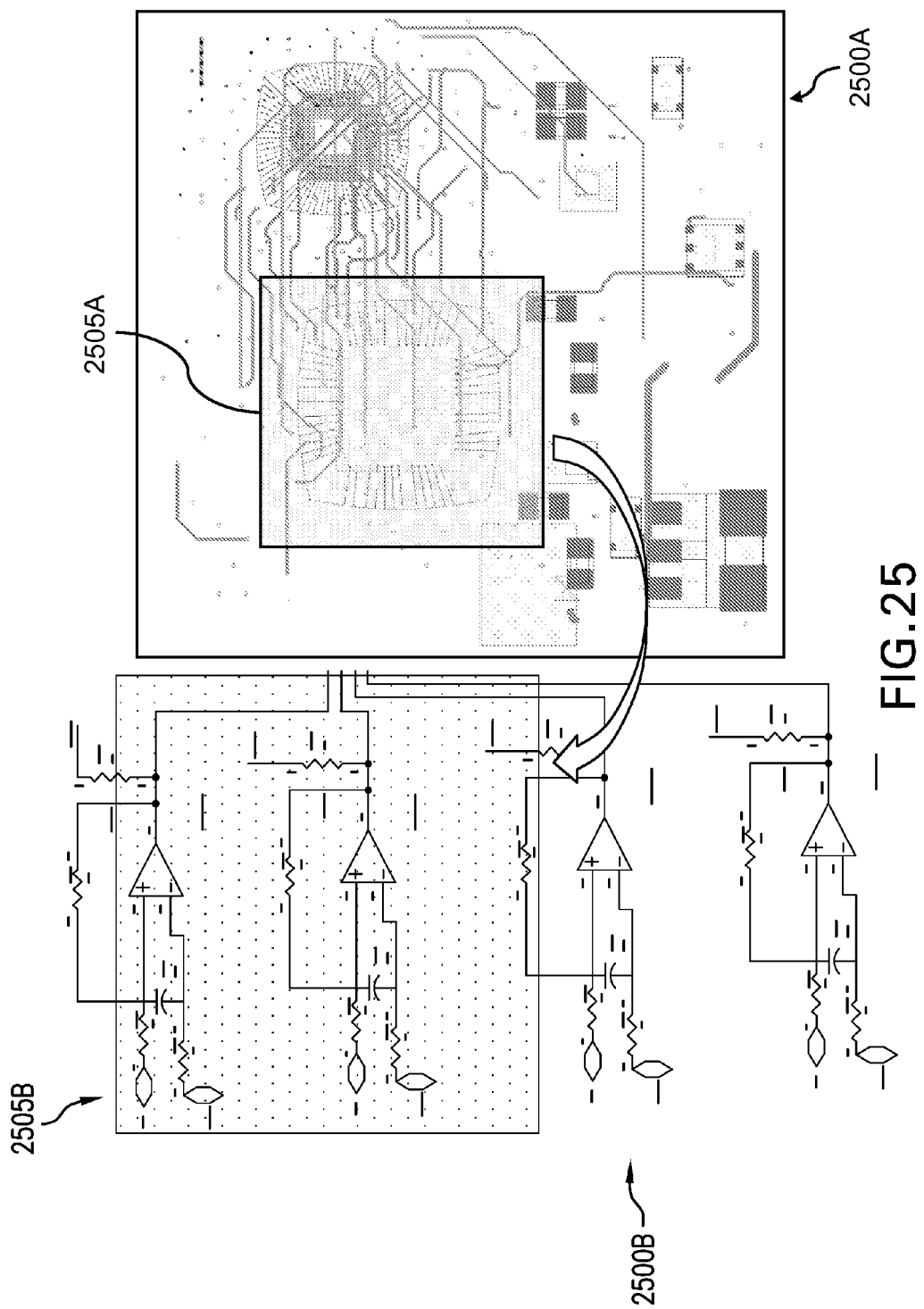
FIG. 25 is an exemplary illustration of two different applications, each operable to perform a different function along the EDA design flow as provided in certain embodiments of the subject Patent Application.

FIG. 25 is a simultaneous composite view of two separate applications along the EDA design flow. 2500B may be a first application or NAPP for a logical schematic of the design whereas 2500A may be a physical layout application or program. Both the logical schematic program 2500B and the physical layout program 2500A are both displaying the same circuit albeit in alternative transformed representations and potentially the same VTOs, correspondingly transformed as well. The logical schematic 2500B is showing ideal components connected in merely a logical manner whereas the physical layout program 2500A is showing a physical, practical, actual layout including physical dimensionality and actual routing electronic connections with actual wire paths that take into account practicalities, parasitic issues, and the like, such that a more thorough and transformed view is displayed. The physical layout 2500A is a lower level, less academic, and more practical representation of the design file. The logical layout 2500B is merely a representation of ideal components connected in any manner and may indeed not at all resemble the physical layout or the actual silicon device end product.

Were a designer of the 2500B logical layout program to select an object, for example, portion 2505B, and create a VTO of a highlighted portion over the objects contained within portion 2505B, a transformed, but nonetheless correlated VTO may be generated and displayed in physical layout program 2500A to highlight the same object, but in its alternate representation 2505A. In this manner, a first user is able to create a VTO highlighting, for example, a portion 2505B, and have that VTO not as a static fixed VTO, but as a dynamic, transformative VTO which follows different transformations of the device in different tools along the EDA tool chain. The VTO is transformed, preferably, responsive to the identity of the application for which it is overlaying. It is very clear that in this instance, the logical layout 2500B differs quite substantially in its physical arrangement and dimensionality from the physical layout 2500A representation of the same circuit or device. Thus, a static overlay VTO would be meaningless to merely overlay with the exact same dimensionality and spatial characteristics. Therefore, the VTO may be initiated in a first application, but the elements of the VTO are preferably selectively tied to individual objects in the design file such that the VTO (or portions of the VTO, the annotations of the VTO, or other information stored in the VTO) may be transformed over to still align, provide context to, and correlate with elements and objects of different applications along different steps of the design path. Please note 2505A has a much different spatial footprint than portion 2505B, yet, they still are annotating the same objects but in an alternative physical representation thereof.

Figure 26:
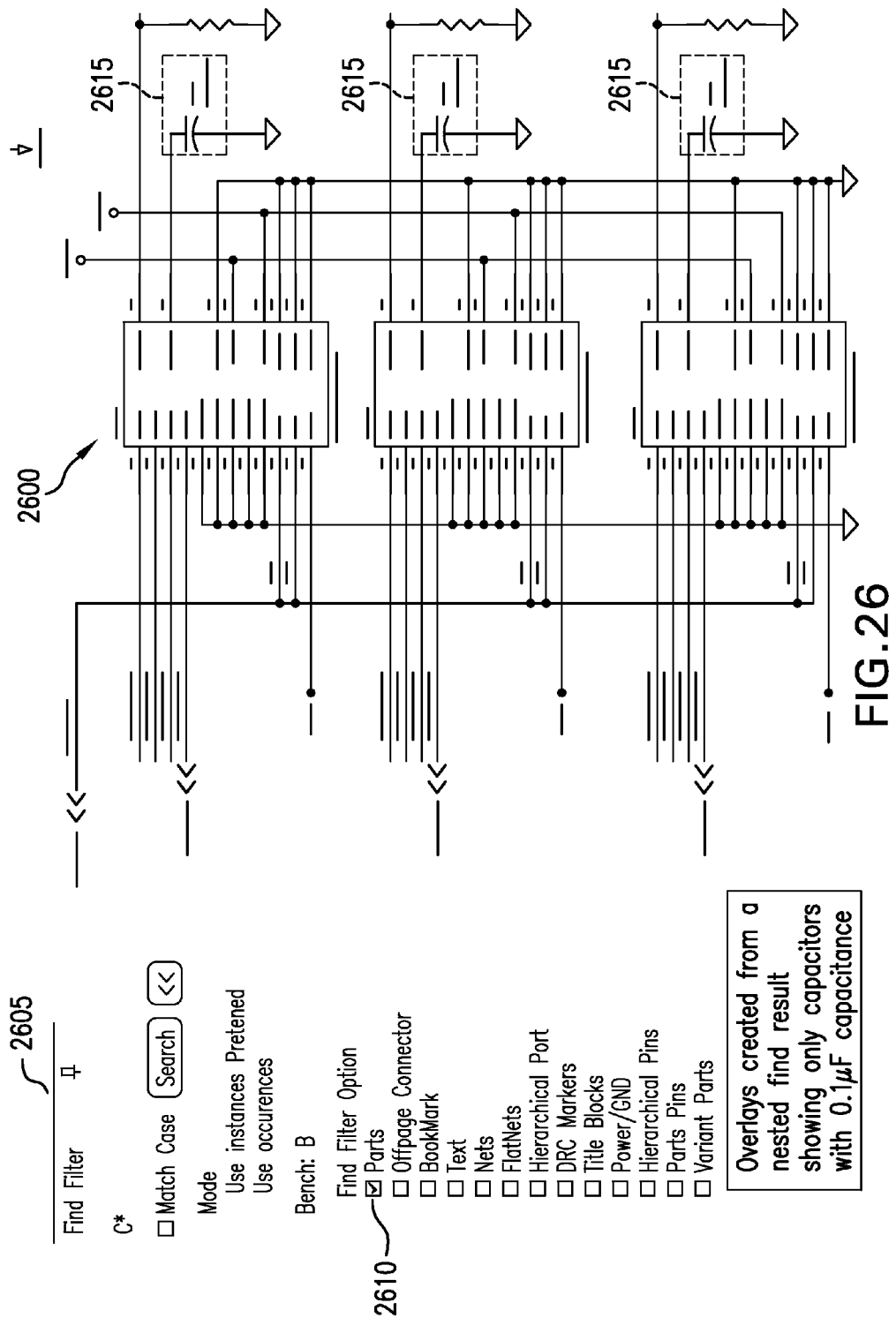
FIG. 26 is another exemplary composite display generated in accordance with certain embodiments of the present invention.

FIG. 26 is an exemplary screen shot of a VTO manager which allows the user to automate creation of VTOs through several different measures including searching functions. A user may operate a find filter or VTO search control box 2605 to search for any type of object, component, interface, connection, or even annotations themselves. In the illustrative view, it is seen that a user has entered a letter C and an asterisk (a wild card) and selected the find filter option of parts at 2610. In such a manner, a user is able to search for any parts beginning with the letter C such as capacitors. The VTO application or VAPP, or the native application may search the design contained in the design file for such part beginning with a C, such as capacitors. In this instance, the results of the find function result in the automatic creation of a VTO 2600 creating annotations such as highlighting superimposed above the results of the find. Annotated highlighted boxes 2615, halos, or any such indicia, may be automatically created above the found results such as capacitors at each of the 2615 portions.

Figure 27:
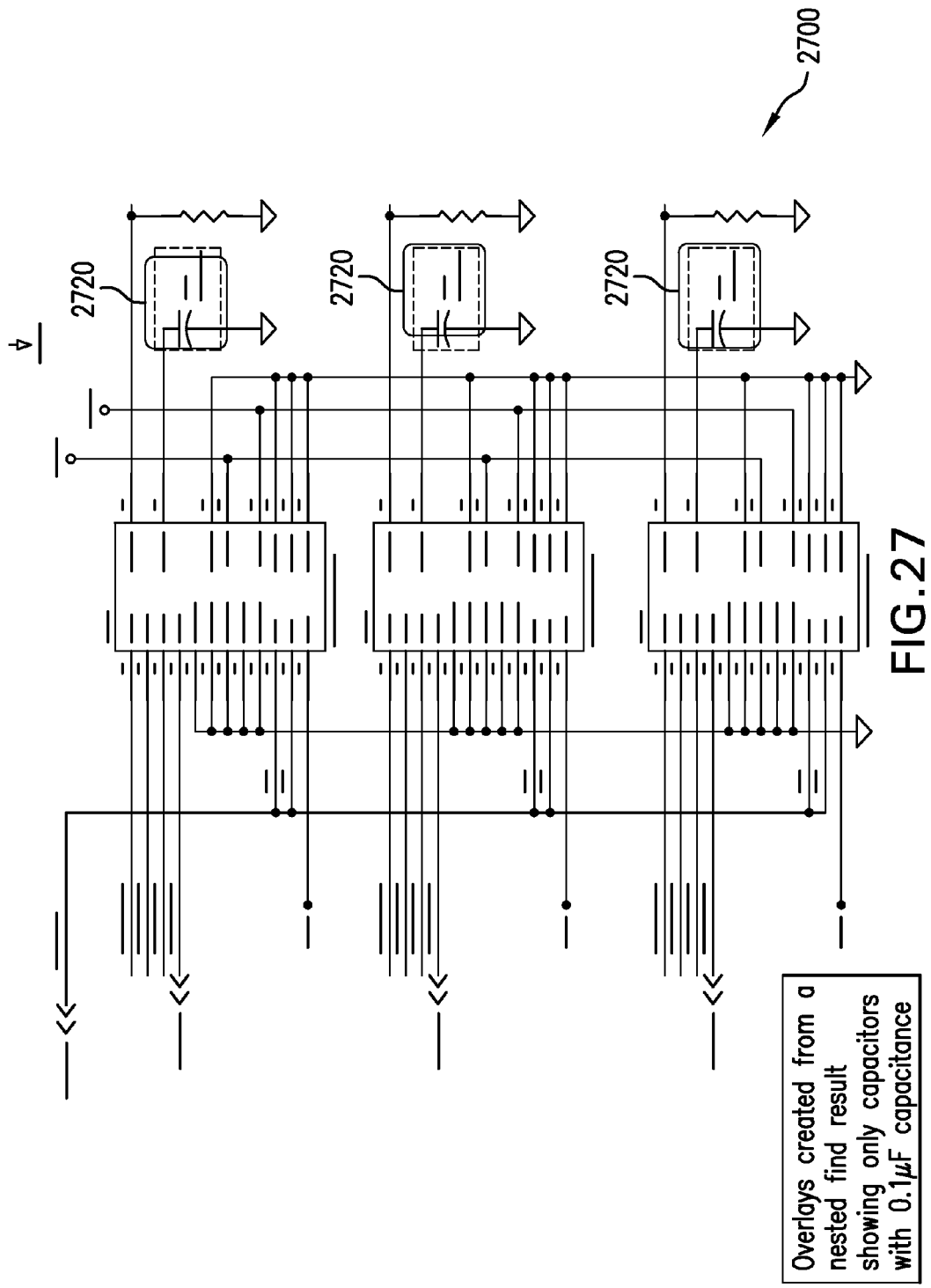
FIG. 27 is an illustrative screen shot of a VTO created as a result of a find operation in accordance with certain embodiments of the present invention; and, FIG. 29 is a simplified schematic diagram of a system in accordance with another exemplary embodiment of the present invention.

FIG. 27 is an exemplary screen shot of a nested find operation. The results of an initial find operation may be further refined to only result in a subset of the initially found objects. In this instance, an initial search for capacitors or any part beginning with the letter C was performed. Subsequent thereto, a secondary or nested search was performed to look for only capacitors with 0.1 microfarad capacitance, and the results 2720 were then automatically highlighted in the VTO which was automatically created. As discussed above, this newly and automatically created VTO highlighting merely the 0.1 microfarad capacitance capacitors may then be used at any point further in the design process and does indeed transform at each different tool. For example, while the instant Fig. shows a logical schematic of the design, further tools along the EDA design flow, such as a physical layout tool, would transform the VTO to highlight the same 0.1 microfarad capacitors as they actually appear in the physical layout or the silicon realization (which may be quite different) as opposed to the ideal or merely abstract logical representation of them shown in the logical schematic 2700.

Figure 28:
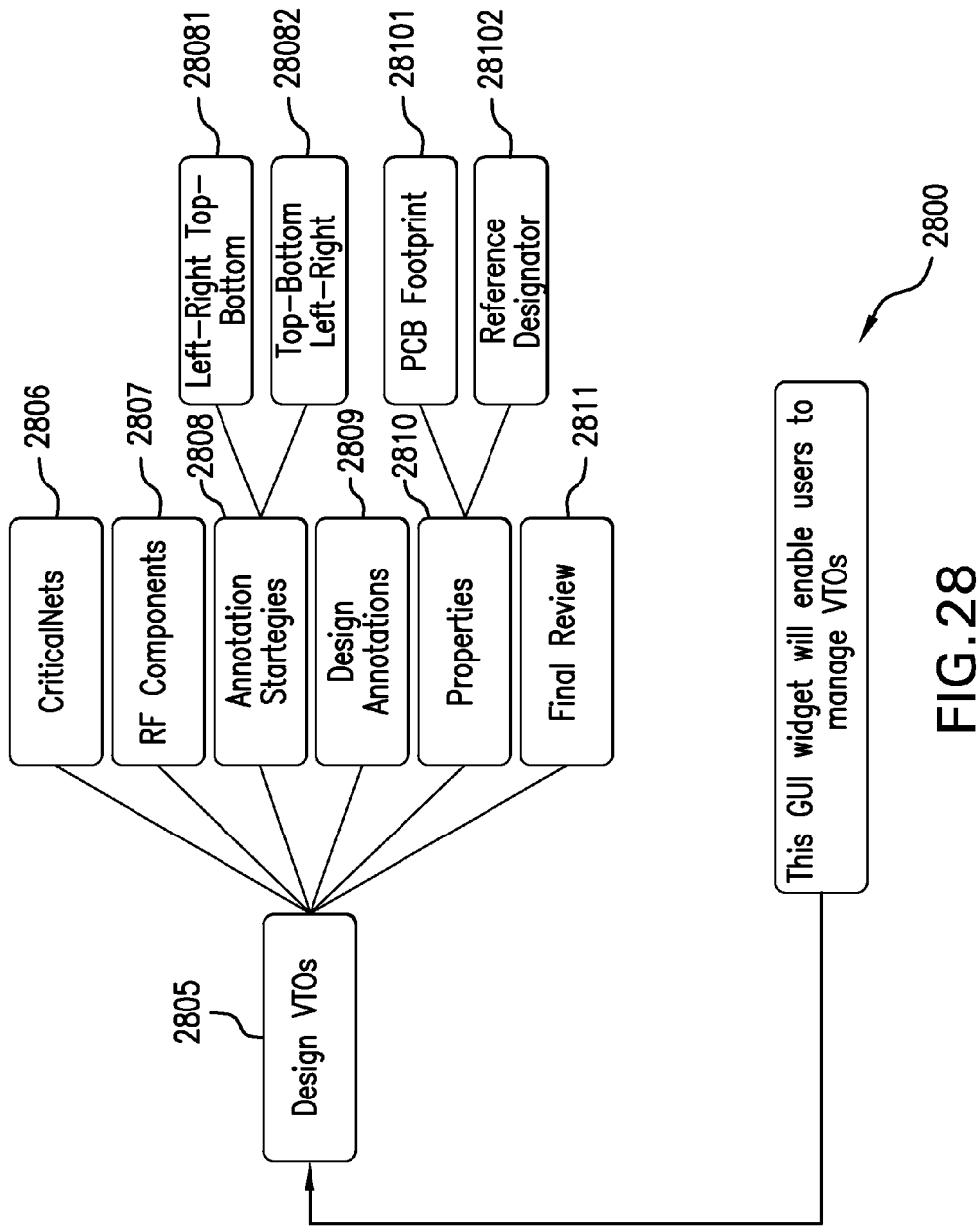

FIG. 28 shows a hierarchical tree representation 2800 of a plurality of different VTOs designed to convey specific information with regard to specific functions along the design flow. The head of the tree is Design VTO 2805 and contains a multitude of different VTOs or VTO types including, for example, critical nets 2806, RF components 2807, annotation strategies 2808 which itself may have a left, right, top, bottom 28081, or a top, bottom, left, right 28082; design annotations 2809; properties 2810 including PCB footprint 28101 and reference designator 28102; final review VTO 2811; and any other type of VTO meant to convey information. Users may select any VTO or combinations of any of the VTOs that they have predetermined permission to access. Individual VTOs may be combined, modified, created, deleted, and portions of VTOs are also separately addressable and able to be manipulated, much in the manner that individual VTOs are. VTOs may be automatically selected for display based on the type of application or the type of user. For example, in a logical schematic application, VTOs which bear relevance to the logical schematic may be automatically selected for display. Additionally, a type of user may be determined, such as by determining the type of user account/login information, and VTOs which bear relevance to the intended job function of the user may be automatically selected. For example, if a PCB package engineer initiates an EDA application, only VTOs which bear relevance to PCB package engineering may be automatically selected for display.

Figure 29:
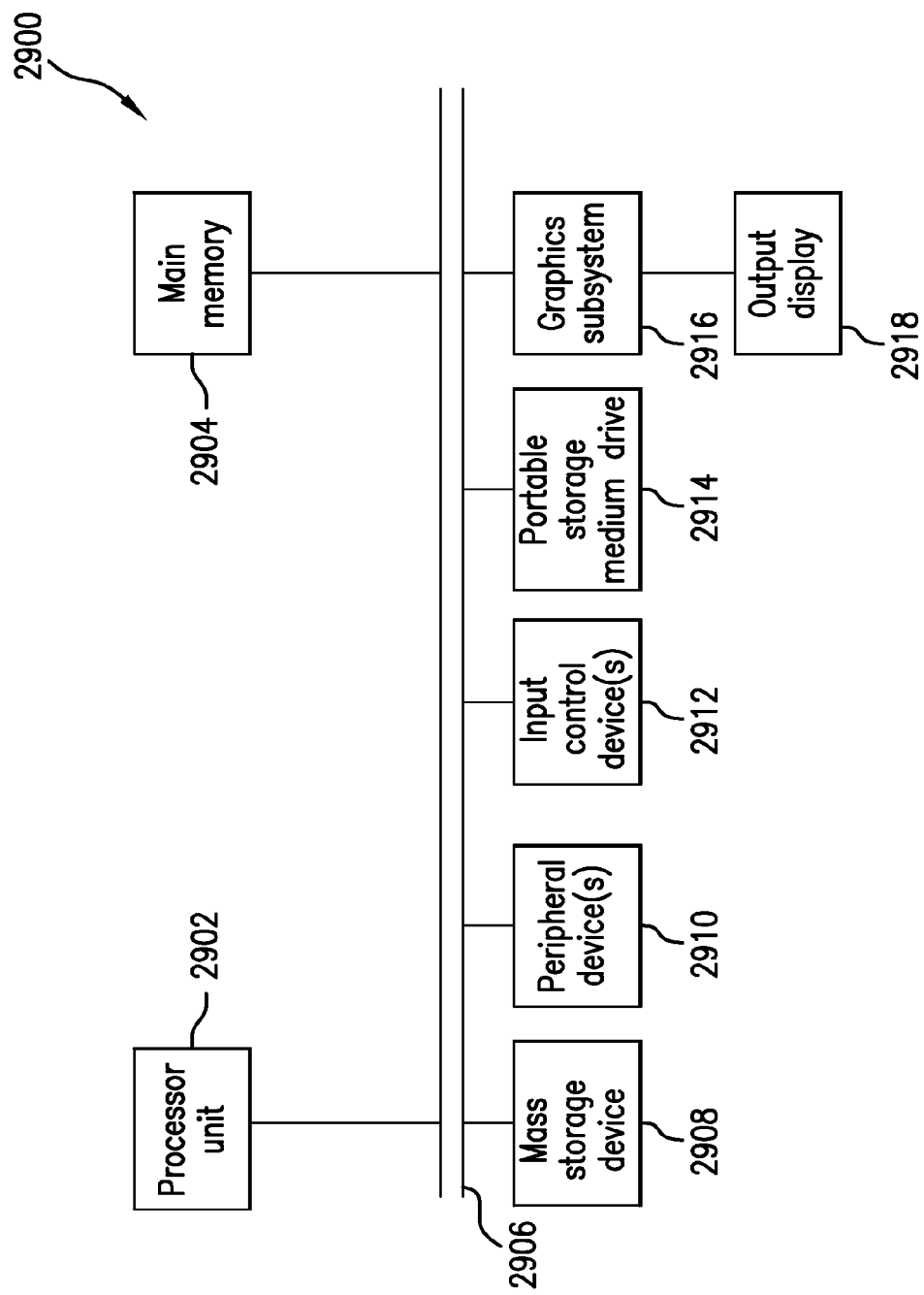

FIG. 29 illustrates a block diagram of a computer system for executing electronic design automation (EDA) in accordance with various embodiments of the present invention. A computer system 2900 contains a processor unit 2902, a main memory 2904, an interconnect bus 2906, a mass storage device 2908, peripheral device(s) 2910, input control device(s) 2912, portable storage drive(s) 2914, a graphics subsystem 2916, and an output display 2918. Processor unit 2902 may include a single microprocessor or a plurality of microprocessors for configuring computer system 2900 as a multiprocessor system. Main memory 2904 stores, in part, instructions and data to be executed by processor 2902. Main memory 2904 preferably includes banks of dynamic random access memory (DRAM) as well as high-speed cache memory.

For the purpose of simplicity, the components of computer system 2900 are connected via interconnect bus 2906. However, computer system 2900 may be connected through one or more data transport measures. For example, processor unit 2902 and main memory 2904 may be connected via a local microprocessor bus and mass storage device 2908, peripheral device(s) 2910, portable storage medium drive(s) 2914, and graphic subsystem 2916 may be connected via one or more input/output (I/O) buses. Mass storage device 2908, which may be implemented with a magnetic disk drive, an optical disk drive, a solid state device, or an attachment to network storage, is non-volatile storage device for storing data, databases, and instructions, to be used by processor unit 2902. In a software embodiment, mass storage device 2908 may store the software to load it into main memory 2904.

Portable storage medium drive 2914 operates in conjunction with a portable non-volatile storage medium such as a floppy disk, a compact disk read only memory (CD-ROM), or a digital versatile disk read only memory (DVD-ROM), to input and output data and code to and from the computer system 2900. In one embodiment, the software is stored on such a portable medium, and is input to computer system 2900 via portable storage medium drive 2914. Peripheral device(s) 2910 may include any type of computer support device such as an input/output (I/O) interface, to add additional functionality to computer system 2900. For example, peripheral device(s) 2910 may include a network interface card to interface computer system 2900 to a network. Peripheral device(s) 2910 may also include a schematic scanner unit to digitize a schematic drawing, a plotter device for printing large-scale design drawings, a 3d printer operable to construct a physical prototype of a device, a silicon mask printer, a foundry for fabricating devices in silicon (which may be located off-site or spatially removed—though ultimately receiving a design from an EDA tool), lithography prototyping equipment, testing interfaces for interfacing with an actual device, and the like.

Input control device(s) 2912 provide a portion of the user interface for a computer system 2900. Input control device(s) 2912 may include an alphanumeric keypad for inputting alphanumeric and other key information; and a cursor control device such as a mouse, a track pad or stylus; or cursor direction keys.

In order to display textual and graphical information, computer system 2900 contains graphic subsystem 2914 and output display(s) 2918. Output display 2918 may include a cathode ray tube (CRT) display, liquid crystal display (LCD), plasma, projector, or active matrix organic light emitting diode (AMOLED) display. Graphic subsystem 2916 receives textual and graphical information and processes the information for output to display 2918.

In a software implementation, the EDA software includes a plurality of computer executable instructions, to be implemented on a computer system. Prior to loading in the computer system, the EDA software may reside as encoded information on a computer-readable tangible medium such as a magnetic floppy disk, a magnetic tape, CD-ROM, DVD-ROM, flash memory, or any other suitable computer readable medium.

In a hardware implementation, such a system may be implemented in any suitable computer based platform known in the art. For example, the system may comprise suitable storage media and one or more dedicated processors or share one or more processors executing/controlling other functions, wherein the employed processor(s) is programmably configured with processor instructions for performing the functions described herein. Suitable circuits may also be developed to execute certain aspects of these functions.

Thereby, EDA designers with minimal effort, errors, expended time, and reduced costs may have an automated system and method for providing annotation overlays to communicate between different tools of the EDA design flow.

Although this invention has been described in connection with specific forms and embodiments thereof, it will be appreciated that various modifications other than those discussed above may be resorted to without departure from the spirit or scope of the invention. For example, equivalent elements may be substituted for those specifically shown and described, certain features may be used independently of other features, and in certain cases, particular combinations of circuit design and implementation flows or processing steps may be reversed, interposed, or combined, all without departing from the spirit or scope of the invention as defined in the appended Claims.

What is being claimed is:

1. A method for applying an inter-application image overlay generated by an overlay application to visually annotate an image display of a plurality of design objects generated by a design application, the method comprising:

executing in a processor both an overlay application to generate an inter-application image overlay and a design application to generate a design image, the design application having executable code to perform at least one stage of an automated design workflow, the overlay application being executable independently of the design application;

executing the design application to operate independent of the overlay application to generate the design image, the design image including a graphic representation of a plurality of design objects;

executing the overlay application to retrieve data of the design application, wherein the overlay application extracts, from the data of the design application, an identifier of each design object and arrangement of the design objects contained in the design image;

executing the overlay application to generate the inter-application image overlay, selectively incorporating into the inter-application image overlay one or more visual annotations of information extrinsic to the design image during the at least one stage of the automated design workflow, each visual annotation corresponding to one or more of the identified design objects of the design image; and, concurrently displaying the inter-application image overlay and the design image, the inter-application image overlay rendered in an overlay application window of the overlay application, the design image rendered in a design application window of the design application separate from the overlay application window, the overlay application window being superimposed over the design application window to visually merge therewith, the design application window being visible through at least a portion of the overlay application window, the inter-application image overlay and design image thereby visually forming a composite display such that each visual annotation of the inter-application image overlay is arranged with respect to at least one design object according to a location thereof.

2. The method as recited in claim 1, wherein the overlay application is executed to query the design application for a Unique Identification (UID) and arrangement of design objects in the design image.

3. The method as recited in claim 2, wherein the overlay application is executed to maintain alignment between the inter-application image overlay and the design image by:

receiving a signal including information of an event in the design application; and duplicating the event in the inter-application image overlay, based on the information.

4. The method as recited in claim 1, wherein the design application includes executable code operable to perform at least one stage of an Electronic Design Automation (EDA) workflow.

5. The method as recited in claim 1, wherein the design application stores at least one representation of the plurality of design objects in a design file.

6. The method as recited in claim 5, wherein at least one inter-application image overlay is stored in an overlay file, apart from the design file, and each inter-application image overlay includes at least one visual annotation related to a particular design application.

7. The method as recited in claim 4, wherein visual annotations are selectively displayed responsive to identification of a type of design application, the type being indicative of a stage of EDA workflow operated upon by the design application.

8. The method as recited in claim 1, wherein visual annotations are selectively displayed responsive to a determination of a type of user account, wherein the user account type is indicative of a job function of a user.

9. A method for providing an inter-application image overlay to transfer visual annotations between a plurality of distinct design applications for display with images respectively generated by the design applications, the method comprising:

establishing first and second design applications on a storage medium, the first design application including executable code operable to perform at least one stage of an automated design workflow for a design having a plurality of design objects, the second design application including a different executable code operable to perform a different stage of the automated design workflow;

establishing an overlay application on a storage medium, the overlay application being executable independently of the first and second design applications;

executing the first design application in a processor to generate a first design image including a graphic representation of a set of the plurality of design objects;

executing the overlay application in a processor to establish an inter-application image overlay including visual annotations of information extrinsic to both the first design image and a second design image of the second design application, wherein the inter-application image overlay is modifiable in correspondence with execution of both the first and second design applications, each visual annotation corresponding to one or more of the plurality of design objects;

concurrently displaying the visual annotations of the inter-application image overlay in correspondence with the design objects of the first design image, the inter-application image overlay rendered in an overlay application window of the overlay application, the first design image rendered in a first design application window of the first design application separate from the overlay application window, the overlay application window being superimposed over the first design application window to visually form a first composite display therewith, the first design application window being visible through at least a portion of the overlay application window, such that each visual annotation of the inter-application image overlay is arranged with respect to at least one design object of the first design image according to a location thereof;

executing the second design application in the processor to generate the second design image including an alternate graphic representation of at least a subset of the plurality of design objects;

executing the overlay application in a processor to adapt display of the inter-application image overlay responsive to the alternate graphic representation of the design objects to maintain a correspondence therebetween; and, concurrently displaying the adapted inter-application image overlay over the second design image, the inter-application image overlay rendered in the overlay application window of the overlay application, the second design image rendered in a second design application window of the second design application separate from the overlay application window, the overlay application window being superimposed over the second design application window to visually form a second composite display therewith, the second design application window being visible through at least a portion of the overlay application window, such that each visual annotation of the inter-application image overlay is arranged with respect to at least one design object of the second design image according to a location thereof.

10. The method as recited in claim 9, further comprising searching the second design image for an alternate representation of a design object to align the inter-application image overlay.

11. The method as recited in claim 10, wherein the searching is performed by comparing each of the design objects in the second image to a library of known object shapes.

12. The method as recited in claim 11, wherein the first and second design applications are Electronic Design Automation (EDA) applications, and the design represents an electronic circuit device having a plurality of circuit components.

13. The method as recited in claim 10, wherein the adapting of the inter-application image overlay includes automatically re-positioning the visual annotations of the image overlay to appear proximal to corresponding design objects of the second design image in the composite display.

14. The method as recited in claim 12, wherein the design includes a logical schematic, the design being stored in a design file.

15. The method as recited in claim 14, wherein the design further includes at least one of a physical layout of an Integrated Circuit (IC) incorporated in the device, a testing configuration of the device, a silicon mask of an IC incorporated in the device, and a Printed Circuit Board (PCB) layout of a PCB incorporated in the device.

16. The method as recited in claim 9, wherein the first design application is a schematic capture tool, and the second design application is one of a layout tool, routing tool, and a simulation tool.

17. The method as recited in claim 9, wherein the concurrent display operation further includes concurrently displaying at least one additional inter-application image overlay to thereby form a composite display including a plurality of inter-application image overlays and the second design image of the second set of design objects.

18. A system for providing an inter-application image overlay to transfer visual annotations between a plurality of distinct computer executable design applications for display with design images respectively generated by the design applications, the system comprising:

a storage medium storing at least one design including a plurality of interconnected design objects;

a computer processor operably coupled to the storage medium, the processor executing:

a first design application module operable to generate and display, in a first design application window, a first design image including a graphic representation of a plurality of design objects of the design retrieved from the storage medium, the first design application module having executable code to perform at least a first stage of an automated design workflow;

a second design application module operable to generate and display, in a second design application window separate from the first design application window, a second design image including an alternate graphic representation of at least a subset of the plurality of design objects of the design retrieved from the storage medium, the second design application module having executable code to perform at least a second stage of the automated design workflow different from the first stage;

an overlay application module being executable independently of the first and second design application modules and operable:

to generate an inter-application image overlay including visual annotations of information extrinsic to both the first and second design images, to selectively display the visual annotations of the inter-application image overlay in an overlay application window of the overlay application while said overlay application window is superimposed over the first design image in the first design application window of the first design application module during operation thereof, thereby visually forming a first composite display, the overlay application window separate from the first and second design application windows, the first design application window being visible through at least a portion of the overlay application window, to selectively display the visual annotations of the inter-application image overlay in the overlay application window of the overlay application while said overlay application window is superimposed over the second design image in the second design application window of the second design application module during operation thereof, thereby visually forming a second composite display, the second design application window being visible through at least a portion of the overlay application window, and to adaptively configure the display of the visual annotations of the inter-application image overlay to correspond to locations of the design objects between the graphic representation and the alternate graphical representations of the respective first and second design application modules, such that each displayed visual annotation of the inter-application image overlay is arranged with respect to at least one design object according to the location thereof; and, a display unit operably coupled to the processor, the display unit operable to receive and display both the first composite display and the second composite display including the respectively corresponding adaptively configured visual annotations of extrinsic information.

19. The system as recited in claim 18, wherein the first design application module is further operable to perform at least one stage of an automated design workflow and the second design application module is further operable to perform at least one different stage of an automated design workflow.

20. The system as recited in claim 19, wherein the overlay application module is further operable to automatically generate visual annotations related to at least a portion of the design objects of the design based on simulation results.

21. The system as recited in claim 19, the computer processor further comprising a cross-probing module operable to accept a selection of at least one design object in the first design application module, and automatically select an alternative representation of the at least one selected design object in the second design application module.

* * * * *